United States Patent
Iwamoto et al.

(10) Patent No.: US 8,753,747 B2
(45) Date of Patent: *Jun. 17, 2014

(54) INTERLAYER FOR LAMINATED GLASS AND LAMINATED GLASS

(75) Inventors: Tatsuya Iwamoto, Kouka (JP); Ryousuke Komatsu, Kouka (JP); Kohei Kani, Kouka (JP); Shogo Yoshida, Kouka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/976,928

(22) PCT Filed: Dec. 28, 2011

(86) PCT No.: PCT/JP2011/080464
§ 371 (c)(1),
(2), (4) Date: Jun. 27, 2013

(87) PCT Pub. No.: WO2012/091117
PCT Pub. Date: Jul. 5, 2012

(65) Prior Publication Data
US 2013/0273379 A1    Oct. 17, 2013

(30) Foreign Application Priority Data

Dec. 28, 2010 (JP) .................. 2010-292946
Jun. 29, 2011 (JP) .................. 2011-144856

(51) Int. Cl.
*B32B 17/10* (2006.01)

(52) U.S. Cl.
USPC ............ 428/436; 428/437; 428/524; 428/525

(58) Field of Classification Search
USPC .................. 428/436, 437, 524, 525
See application file for complete search history.

(56) References Cited

U.S. PATENT DOCUMENTS

| | | |
|---|---|---|
| 2012/0244329 A1 | 9/2012 | Iwamoto et al. |
| 2012/0244364 A1 | 9/2012 | Iwamoto et al. |

FOREIGN PATENT DOCUMENTS

| | | |
|---|---|---|
| CA | 2162243 A1 | 11/1995 |
| EP | 0 710 545 A1 | 5/1996 |
| EP | 2 520 551 A1 | 11/2012 |
| EP | 2 520 552 A1 | 11/2012 |

(Continued)

OTHER PUBLICATIONS

International Search Report for the Application No. PCT/JP2011/080464 mailed Mar. 13, 2012.

(Continued)

*Primary Examiner* — D. S. Nakarani
(74) *Attorney, Agent, or Firm* — Cheng Law Group, PLLC

(57) ABSTRACT

The present invention provides an interlayer film for a laminated glass capable of suppressing bubble formation and bubble growth even if the laminated glass is exposed to relatively high temperatures for a long time. An interlayer film for a laminated glass according to the present invention includes a first layer and a second layer laminated on one face of the first layer, each of the first layer and the second layer contains a polyvinyl acetal resin and a plasticizer, and in the case of measuring the viscoelasticity of the first layer as a resin film (glass transition temperature: Tg(° C.)), or the viscoelasticity of a resin film (glass transition temperature: Tg(° C.)) containing 100 parts by weight the polyvinyl acetal resin in the first layer and 60 parts by weight of triethylene glycol di-2-ethylhexanoate (3GO) as a plasticizer, the resin film has an elastic modulus of G'(Tg+170) at (Tg+170)° C. and an elastic modulus of G'(Tg+30) at (Tg+30)° C., and provides a ratio (G'(Tg+170)/G'(Tg+30)) of 0.18 or higher.

17 Claims, 2 Drawing Sheets

(56) References Cited

FOREIGN PATENT DOCUMENTS

| | | |
|---|---|---|
| JP | 1-252556 A | 10/1989 |
| JP | 9-40444 A | 2/1997 |
| JP | 10-36146 A | 2/1998 |
| JP | 10-316454 A | 12/1998 |
| JP | 11-106594 A | 4/1999 |
| JP | 11-106595 A | 4/1999 |
| JP | 11-255827 A | 9/1999 |
| JP | 2007-70200 A | 3/2007 |
| JP | 2007-76186 A | 3/2007 |
| WO | WO-2011/08119 A1 | 7/2011 |

OTHER PUBLICATIONS

Written Opinion of the International Searching Authority (PCT/ISA/237) for Application No. PCT/JP2011/080464 malied Mar. 13, 2012.

Written Opinion of the International Searching Authority (PCT/ISA/237) for Application No. PCT/JP2011/080464 mailed Jul. 18, 2013.

INTERLAYER FOR LAMINATED GLASS AND LAMINATED GLASS

TECHNICAL FIELD

The present invention relates to an interlayer film for a laminated glass that has a multi-layer structure including at least two layers. More specifically, the present invention relates to an interlayer film for a laminated glass, each layer of which contains a thermoplastic resin and a plasticizer; and a laminated glass including the interlayer film for a laminated glass.

BACKGROUND ART

A laminated glass is a safety glass which, even when broken by impact from the outside, shatters into few flying glass fragments. For this reason, the laminated glass is widely used for vehicles, rail cars, aircrafts, boats and ships, buildings, and the like. The laminated glass is produced by sandwiching an interlayer film for a laminated glass between a pair of glass plates.

Patent Document 1 discloses one example of the interlayer film for a laminated glass; that is, it teaches a sound insulation layer that contains 100 parts by weight of a polyvinyl acetal resin having a degree of acetalization of 60 to 85 mol %, 0.001 to 1.0 part by weight of at least one metal salt of alkali metal salts and alkaline earth metal salts, and 30 parts by weight or more of a plasticizer. This sound insulation layer alone can be used as an interlayer film.

Patent Document 1 also teaches a multilayered interlayer film in which the sound insulation layer and other layers are laminated. Each of the other layers laminated on the sound insulation layer contains 100 parts by weight of a polyvinyl acetal resin having a degree of acetalization of 60 to 85 mol %, 0.001 to 1.0 part by weight of at least one metal salt of alkali metal salts and alkaline earth metal salts, and 30 parts by weight or less of a plasticizer.

RELATED ART DOCUMENT

Patent Document

Patent Document 1: JP 2007-070200 A

SUMMARY OF THE INVENTION

Problems to be Solved by the Invention

A laminated glass formed by using the interlayer film of Patent Document 1 unfortunately has insufficient sound insulation for sound with a frequency of about 2000 Hz, and thus reduction in the sound insulation due to the coincidence effect cannot be avoided in some cases. Also, the laminated glass sometimes provides insufficient sound insulation at around 20° C.

Here, the coincidence effect refers to a phenomenon in which, upon incidence of sound waves on a glass plate, traverse waves spread on the glass surface to resonate with the incidence sound due to the rigidity and the inertia of the glass plate, whereby the sound is transmitted.

In the case of forming a laminated glass with the multilayered interlayer film in which a sound insulation layer and other layers are laminated according to Patent Document 1, the sound insulation of the laminated glass at around 20° C. is increased to some extent. However, the multilayered interlayer film includes the sound insulation layer, and thus bubble formation may occur in the laminated glass including the multilayered interlayer film.

Furthermore, recently, it has been studied to increase the amount of a plasticizer contained in the interlayer film in order to improve the sound insulation of a laminated glass. As the amount of the plasticizer in the interlayer film increases, the sound insulation of the laminated glass can be improved. If the amount of the plasticizer increases, however, bubble formation may occur in the laminated glass.

A laminated glass used in buildings or vehicles is often used under exposure to sunlight and under relatively high temperatures for a long time. For example, a laminated glass is occasionally used under the temperature condition of higher than 50° C. Bubble formation and bubble growth are more likely to occur in a laminated glass which is exposed to relatively high temperatures for a long time.

The present invention aims to provide an interlayer film for a laminated glass which can give a laminated glass capable of suppressing bubble formation and bubble growth even if the laminated glass is exposed to relatively high temperatures for a long time; and a laminated glass including the interlayer film for a laminated glass.

The present invention limitedly aims to provide an interlayer film for a laminated glass which can provide a laminated glass that is also excellent in sound insulation; and a laminated glass including the interlayer film for a laminated glass.

Means for Solving the Problems

According to a broad aspect of the present invention, the present invention provides an interlayer film for a laminated glass, including a first layer containing a polyvinyl acetal resin and a plasticizer, and a second layer containing a polyvinyl acetal resin and a plasticizer, the second layer being laminated on one face of the first layer, wherein, in the case of measuring viscoelasticity of a resin film formed from the first layer, the resin film, having a glass transition temperature of Tg(° C.), has an elastic modulus of G'(Tg+170) at (Tg+170)° C. and an elastic modulus of G'(Tg+30) at (Tg+30)° C., and provides a ratio (G'(Tg+170)/G'(Tg+30)) of 0.18 or higher.

Moreover, according to a broad aspect of the present invention, the present invention provides an interlayer film for a laminated glass, including a first layer containing a polyvinyl acetal resin and a plasticizer, and a second layer containing a polyvinyl acetal resin and a plasticizer, the second layer being laminated on one face of the first layer, wherein, in the case of measuring viscoelasticity of a resin film containing 100 parts by weight of the polyvinyl acetal resin contained in the first layer and 60 parts by weight of triethylene glycol di-2-ethylhexanoate (3GO) as a plasticizer, the resin film, having a glass transition temperature of Tg (° C.), has an elastic modulus of G'(Tg+170) at (Tg+170)° C. and an elastic modulus of G'(Tg+30) at (Tg+30)° C., and provides a ratio (G'(Tg+170)/G'(Tg+30)) of 0.18 or higher.

In a specific aspect of the interlayer for a laminated glass according to the present invention, the polyvinyl acetal resin in the first layer preferably has a degree of acetylation of 8 mol % or higher; or the polyvinyl acetal resin in the first layer preferably has a degree of acetylation of lower than 8 mol % and a degree of acetalization of 68 mol % or higher. The polyvinyl acetal resin in the first layer has a degree of acetylation of 8 mol % or higher. The polyvinyl acetal resin in the first layer has a degree of acetylation of lower than 8 mol % and a degree of acetalization of 68 mol % or higher.

In another specific aspect of the interlayer film for a laminated glass according to the present invention, the first layer contains a compound having a boron atom.

In yet another specific aspect of the interlayer film for a laminated glass according to the present invention, the compound having a boron atom is at least one selected from the group consisting of lithium metaborate, sodium tetraborate, potassium tetraborate, boric acid, and boric acid esters.

In another specific aspect of the interlayer film for a laminated glass according to the present invention, the elastic modulus $G'(Tg+30)$ is 200,000 Pa or higher.

In another specific aspect of the interlayer film for a laminated glass according to the present invention, the polyvinyl acetal resin in the first layer has a molecular-weight distribution ratio (weight-average molecular weight Mw/number-average molecular weight Mn) of 6.5 or lower.

In yet another specific aspect of the interlayer film for a laminated glass according to the present invention, the polyvinyl acetal resin in the first layer has a molecular-weight distribution ratio (weight-average molecular weight Mw/number-average molecular weight Mn) of 2.5 to 3.2.

In a specific aspect of the interlayer film for a laminated glass according to the present invention, an amount of the plasticizer for each 100 parts by weight of the polyvinyl acetal resin in the first layer is 50 parts by weight or more.

In yet another specific aspect of the interlayer film for a laminated glass according to the present invention, the amount of the plasticizer for each 100 parts by weight of the polyvinyl acetal resin in the first layer is 55 parts by weight or more.

In another specific aspect of the interlayer film for a laminated glass according to the present invention, the polyvinyl acetal resin in the first layer has a hydroxy group content of 30 mol % or lower.

In another specific aspect of the interlayer film for a laminated glass according to the present invention, the film further includes a third layer containing a polyvinyl acetal resin and a plasticizer, the third layer being laminated on the other face of the first layer.

In yet another specific aspect of the interlayer film for a laminated glass according to the present invention, the amount of the plasticizer for each 100 parts by weight of the polyvinyl acetal resin in the first layer is larger than an amount of the plasticizer for each 100 parts by weight of the polyvinyl acetal resin in the second layer or the third layer.

The polyvinyl acetal resin in each of the first layer, the second layer and the third layer preferably contains a polyvinyl butyral resin. The plasticizer in each of the first layer, the second layer and the third layer preferably contains at least one selected from the group consisting of triethylene glycol di-2-ethylbutyrate, triethylene glycol di-2-ethylhexanoate, and triethylene glycol di-n-heptanoate.

A laminated glass according to the present invention includes a first component for laminated glass, a second component for laminated glass, and an interlayer film sandwiched between the first component for laminated glass and the second component for laminated glass, wherein the interlayer film is the interlayer for a laminated glass formed according to the present invention.

Effect of the Invention

The interlayer film for a laminated glass according to the present invention includes a first layer containing a polyvinyl acetal resin and a plasticizer, and a second layer containing a polyvinyl acetal resin and a plasticizer, the second layer being laminated on one face of the first layer. The ratio $(G'(Tg+170)/G'(Tg+30))$ is 0.18 or higher. Accordingly, bubble formation and bubble growth can be suppressed in the laminated glass including the interlayer film for a laminated glass according to the present invention even if the laminated glass is exposed to relatively high temperatures for a long time.

MODE(S) FOR CARRYING OUT THE INVENTION

Hereinafter, the present invention will be described by means of specific Embodiments and Examples of the present invention, with reference to the drawings.

Figure 1:
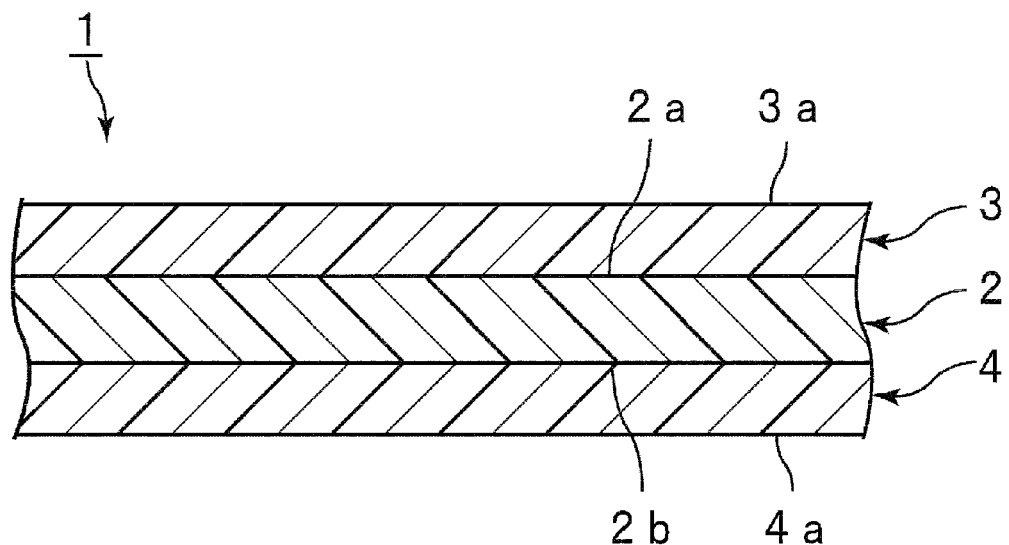
FIG. 1 is a cross-sectional view schematically illustrating an interlayer film for a laminated glass according to one embodiment of the present invention.

FIG. 1 is a cross-sectional view schematically illustrating an interlayer film for a laminated glass according to one embodiment of the present invention.

An interlayer film 1 illustrated in FIG. 1 includes a first layer 2, a second layer 3 laminated on one face 2a (first face) of the first layer 2, and a third layer 4 laminated on the other face 2b (second face) of the first layer 2. The interlayer film 1 is used for forming a laminated glass. The interlayer film 1 is an interlayer film for a laminated glass. The interlayer film 1 is a multilayered interlayer film.

The first layer 2 is arranged between the second layer 3 and the third layer 4, namely, sandwiched between the second layer 3 and the third layer 4. In the present embodiment, the first layer 2 is an intermediate layer, and the second layer 3 and the third layer 4 are surface layers. Here, the second layer 3 and the third layer 4 may be intermediate layers, and an additional interlayer film for a laminated glass may be laminated on each of an outer surface 3a and an outer surface 4a of the respective second layer 3 and third layer 4.

The first layer 2, the second layer 3, and the third layer 4 each preferably contain a polyvinyl acetal resin and a plasticizer.

The main feature of the present embodiment is that, in the case (test method A) of measuring viscoelasticity of a resin film A containing 100 parts by weight of the polyvinyl acetal resin contained in the first layer 2 and 60 parts by weight of triethylene glycol di-2-ethylhexanoate (3GO) as a plasticizer, the resin film A, having a glass transition temperature of Tg (° C.), has an elastic modulus of $G'(Tg+170)$ at $(Tg+170)$° C. and an elastic modulus of $G'(Tg+30)$ at $(Tg+30)$° C., and provides a ratio $(G'(Tg+170)/G'(Tg+30))$ of 0.18 or higher.

Also in the present embodiment, in the case (test method B) of measuring viscoelasticity of a resin film B formed from the first layer 2, the resin film B, having a glass transition temperature of Tg(° C.), has an elastic modulus of $G'(Tg+170)$ at $(Tg+170)$° C. and an elastic modulus of $G'(Tg+30)$ at $(Tg+30)$° C., and provides a ratio $(G'(Tg+170)/G'(Tg+30))$ of 0.18 or higher.

In test method B, the first layer 2 is used as the resin film B, i.e., the first layer 2 itself is the resin film B.

The resin film B is the first layer 2, and thus the resin film B contains the polyvinyl acetal resin and the plasticizer at the same weight ratio as that in the first layer 2. In test method B, the elastic modulus G'(Tg+170) and the elastic modulus G'(Tg+30) are preferably measured after the plasticizer is migrated in the interlayer film for a laminated glass. In test method B, the elastic modulus G'(Tg+170) and the elastic modulus G'(Tg+30) are more preferably measured after the interlayer film for a laminated glass is stored at the humidity of 30% (±3%, at the temperature of 23° C.) for one month and the plasticizer is migrated in the interlayer film for a laminated glass.

The glass transition temperature Tg(° C.) represents the peak temperature of the loss factor tan δ determined from the test results of the above viscoelasticity measurement.

The present inventors have found that the plasticizer migrates between the layers in a multilayered interlayer film for a laminated glass, and as a result, a layer containing a large amount of the plasticizer is formed; for example, the plasticizer migrates from the second or third layer to the first layer, and the first layer turns out to contain a large amount of the plasticizer. The present inventors have also found that, as the layer containing a larger amount of plasticizer is formed, in other words, as the amount of the plasticizer in the first layer increases, bubble formation is likely to occur in a laminated glass including the interlayer film for laminated glass, and bubble formation once occurs, the generated bubbles tend to serve as cores and thereby to cause bubble growth.

The present inventors have made various studies to suppress the bubble formation and bubble growth. Consequently, they also have found that, if a laminated glass includes an interlayer film for a laminated glass in which the ratio (G'(Tg+170)/G'(Tg+30)) is 0.18 or higher in the aforementioned test method A or test method B, bubble formation and bubble growth in the laminated glass can be sufficiently suppressed even if the laminated glass is exposed to relatively high temperatures for a long time. Bubble formation and bubble growth in the laminated glass can be sufficiently suppressed even if the first layer 2 contains a large amount of the plasticizer. Thus, the sound insulation of the laminated glass can be increased. In particular, if the laminated glass includes an interlayer film 1 for a laminated glass which satisfies the ratio (G'(Tg+170)/G'(Tg+30)) of 0.18 or higher and includes the second layer 3 and the third layer 4 which are respectively laminated on both faces of the first layer 2, bubble formation and bubble growth in a laminated glass can be further suppressed even if the laminated glass is exposed to relatively high temperatures for a long time.

The ratio (G'(Tg+170)/G'(Tg+30)) is 0.18 or higher, preferably 0.2 or higher, and preferably 1.0 or lower. If the ratio (G'(Tg+170)/G'(Tg+30)) satisfies the preferable lower limit and the preferable upper limit, bubble formation and bubble growth in the laminated glass can be more efficiently suppressed even if the laminated glass is stored under considerably severe conditions for a long time.

A laminated glass used in buildings or vehicles is often used under exposure to sunlight and under relatively high temperatures. For example, a laminated glass is occasionally used under the temperature condition of higher than 50° C. In the case of the ratio (G'(Tg+170)/G'(Tg+30)) of 0.18 or higher in the test method A or the ratio (G'(Tg+170)/G'(Tg+30)) of 0.18 or higher in the test method B, bubble formation and bubble growth in the laminated glass can be furthermore suppressed even if the laminated glass is stored under considerably severe, high temperature (for example, 40 to 60° C., occasionally higher than 50° C.) conditions for a long time.

In terms of furthermore suppressing bubble formation and bubble growth in the laminated glass under high temperature conditions, the ratio (G'(Tg+170)/G'(Tg+30)) is preferably 0.2 or higher, more preferably 0.22 or higher, still more preferably 0.3 or higher, and particularly preferably 0.4 or higher, and is more preferably 0.95 or lower. In particular, in the case where the ratio (G'(Tg+170)/G'(Tg+30)) is controlled by the average degree of polymerization of the polyvinyl alcohol resin, or by the compound containing a boron atom, the ratio (G'(Tg+170)/G'(Tg+30)) is preferably 0.22 or higher, more preferably 0.3 or higher, and still more preferably 0.4 or higher, and is preferably 0.9 or lower, and more preferably 0.88 or lower to sufficiently suppress bubble formation and bubble growth in the laminated glass, and to further increase the sound insulation of the laminated glass. If the ratio (G'(Tg+170)/G'(Tg+30)) is 0.85 or lower, the interlayer film can be easily formed.

In the case (test method A) of measuring viscoelasticity of a resin film A containing 100 parts by weight of the polyvinyl acetal resin contained in the first layer 2 and 60 parts by weight of triethylene glycol di-2-ethylhexanoate (3GO) as a plasticizer, the resin film A, having a glass transition temperature of Tg (° C.), has an elastic modulus of G'(Tg+80) at (Tg+80)° C. and an elastic modulus of G'(Tg+30) at (Tg+30)° C., and preferably provides a ratio (G'(Tg+80)/G'(Tg+30)) of 0.65 or higher.

In the case (test method B) of measuring viscoelasticity of a resin film B formed from the first layer 2, the resin film B, having a glass transition temperature of Tg(° C.), has an elastic modulus of G'(Tg+80) at (Tg+80)° C. and an elastic modulus of G'(Tg+30) at (Tg+30)° C., and preferably provides a ratio (G'(Tg+80)/G'(Tg+30)) of 0.65 or higher.

In the case where the ratio (G'(Tg+170)/G'(Tg+30)) is 0.18 or higher, and the ratio (G'(Tg+80)/G'(Tg+30)) is 0.65 or higher, bubble formation and bubble growth in a laminated glass can be further suppressed in a wide range of temperatures. In the case where the ratio (G'(Tg+170)/G'(Tg+30)) is 0.20 or higher, and the ratio (G'(Tg+80)/G'(Tg+30)) is 0.65 or higher, bubble formation and bubble growth in a laminated glass can be even further suppressed in a wide range of temperatures. Meanwhile, if the ratio (G'(Tg+170)/G'(Tg+30)) in test method A is 0.18 or higher, or the ratio (G'(Tg+170)/G'(Tg+30)) in test method B is 0.18 or higher, the ratio (G'(Tg+80)/G'(Tg+30)) in test method A may be lower than 0.65, and the ratio (G'(Tg+80)/G'(Tg+30)) in test method B may be lower than 0.65.

The ratio (G'(Tg+80)/G'(Tg+30)) is preferably 1.0 or lower. If the ratio (G'(Tg+80)/G° (Tg+30)) is 0.65 or higher, bubble formation and bubble growth in the laminated glass can easily be more efficiently suppressed. Moreover, if the ratio (G'(Tg+80)/G'(Tg+30)) satisfies the preferable lower limit and the preferable upper limit, bubble formation and bubble growth in the laminated glass can easily be more efficiently suppressed.

In terms of further suppressing bubble formation and bubble growth in a laminated glass, the ratio (G'(Tg+80)/G'(Tg+30)) is more preferably 0.7 or higher and more preferably 0.95 or lower, and is still more preferably 0.75 or higher and still more preferably 0.9 or lower. In particular, in the case where the ratio (G'(Tg+80)/G'(Tg+30)) is controlled by the average degree of polymerization of the polyvinyl alcohol resin, the ratio (G'(Tg+80)/G'(Tg+30)) is preferably 0.65 or higher, more preferably 0.66 or higher, still more preferably 0.67 or higher, and particularly preferably 0.7 or higher, and is preferably 0.82 or lower, and more preferably 0.8 or lower to sufficiently suppress bubble formation and bubble growth in the laminated glass, and to further increase the sound insulation of the laminated glass. If the ratio (G'(Tg+80)/G'(Tg+30)) is 0.82 or lower or 0.8 or lower, the interlayer film can be easily formed.

Examples of the method of setting the ratio (G'(Tg+170)/G'(Tg+30)) in test method A or test method B to 0.18 or higher include a method of using a polyvinyl alcohol resin having a comparatively high average degree of polymerization in synthesis of a polyvinyl acetal resin in the first layer 2; a method of increasing the interaction between the molecules of the polyvinyl acetal resin in the first layer 2; and a method of adding a compound having a boron atom in the first layer 2. Examples of the method of increasing the interaction between the molecules of the polyvinyl acetal resin in the first layer 2 include a method of physically crosslinking the molecules of the polyvinyl acetal resin, and a method of chemically crosslinking the molecules. In terms of easy formation of the interlayer film 1 with an extruder, preferable among the above are the method of using a polyvinyl alcohol resin having a comparatively high average degree of polymerization in synthesis of a polyvinyl acetal resin in the first layer 2, the method of physically crosslinking the molecules of the polyvinyl acetal resin in the first layer 2, and the method of adding a compound having a boron atom in the first layer 2.

Examples of the method of setting the ratio (G'(Tg+80)/G'(Tg+30)) in test method A or test method B to 0.65 or higher include a method of using a polyvinyl alcohol resin having a comparatively high average degree of polymerization in synthesis of a polyvinyl acetal resin in the first layer; and a method of increasing the interaction between the molecules of the polyvinyl acetal resin in the first layer 2. Examples of the method of increasing the interaction between the molecules of the polyvinyl acetal resin in the first layer include a method of physically crosslinking the molecules of the polyvinyl acetal resin, and a method of chemically crosslinking the molecules. In terms of easy formation of the interlayer film 1 with an extruder, preferable among these are a method of using a polyvinyl alcohol resin having a comparatively high average degree of polymerization in synthesis of a polyvinyl acetal resin in the first layer 2, and a method of physically crosslinking the molecules of the polyvinyl acetal resin in the first layer 2.

One example of the relation between the loss factor tan δ and the temperature and the relation between the elastic modulus G' and the temperature will be described by means of FIG. 3.

Figure 3:
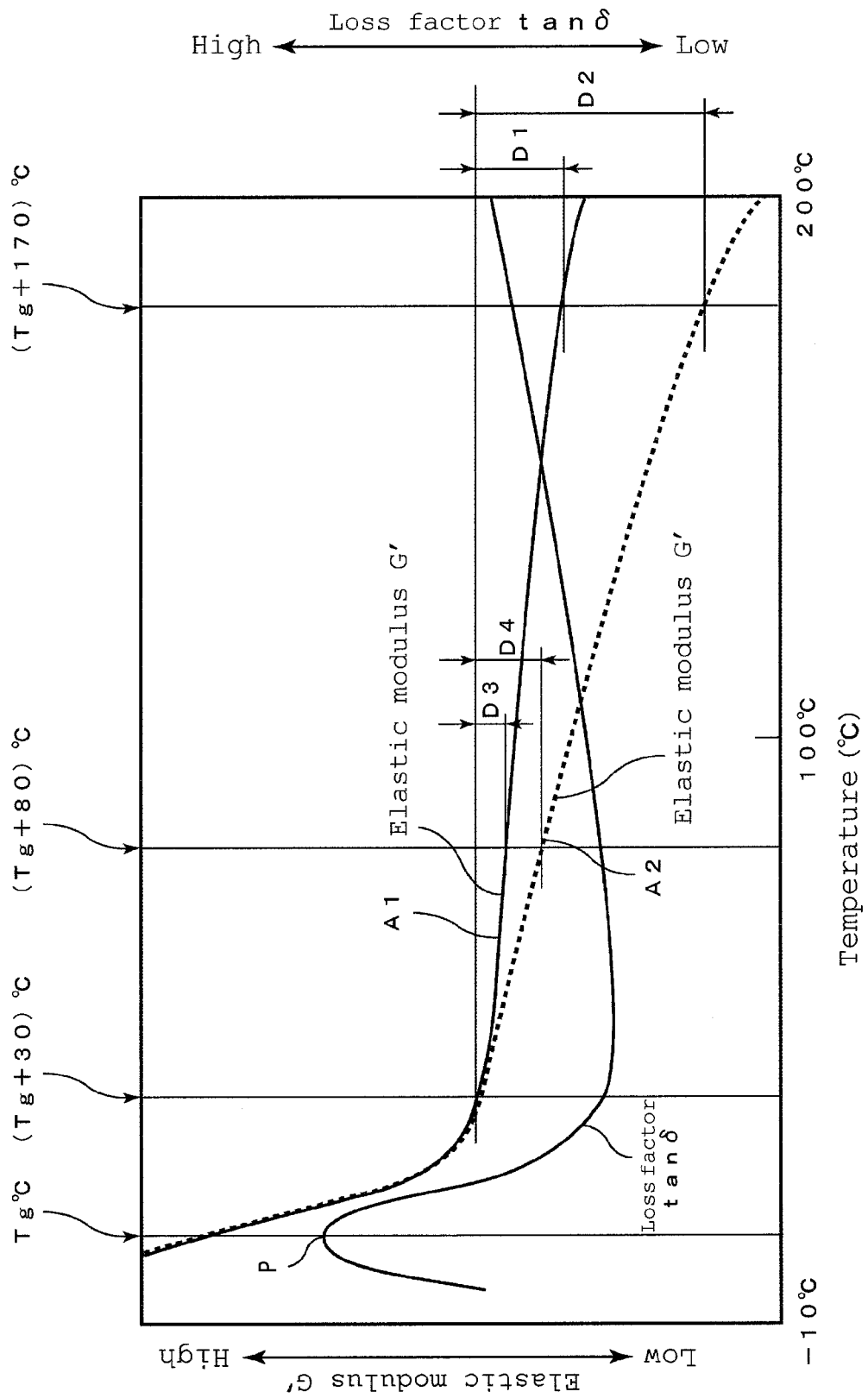
FIG. 3 is a view for explaining the relation between a loss factor tan δ and the temperature and the relation between an elastic modulus G' and the temperature, which have resulted from measurement of the viscoelasticity of a resin film containing the polyvinyl acetal resin and triethylene glycol di-2-ethylhexanoate in the first layer.

The loss factor tan δ and the temperature are in the relation shown in FIG. 3. The temperature at the peak P of the loss factor tan δ is the glass transition temperature Tg.

The glass transition temperature Tg of the elastic modulus G' of the dashed line A2 illustrated in FIG. 3 is the same as the glass transition temperature Tg of the elastic modulus G' of the solid line A1. For example, if the amount D of change in the elastic modulus G'(Tg+170) based on the elastic modulus G'(Tg+30) is smaller, bubble formation and bubble growth in the laminated glass can be more effectively suppressed under considerably severe, high temperature (for example, 40 to 60° C., occasionally higher than 50° C.) conditions. The amount D1 of change in the elastic modulus G' of the solid line A1 is smaller than the amount D2 of change in the elastic modulus G' of the dashed line A2. Thus, bubble formation and bubble growth in the laminated glass can be more effectively suppressed even under considerably severe, high temperature conditions in the case where the resin film shows the elastic modulus G' of the solid line A1 with a comparatively small amount D1 of change than in the case where the resin film shows the elastic modulus G' of the dashed line A2 with a comparatively large amount D2 of change in FIG. 3.

The glass transition temperature Tg of the elastic modulus G' of the dashed line A2 illustrated in FIG. 3 is the same as the glass transition temperature Tg of the elastic modulus G' of the solid line A1. For example, if the amount D of change in the elastic modulus G'(Tg+80) based on the elastic modulus G'(Tg+30) is smaller, bubble formation and bubble growth in the laminated glass can be more effectively suppressed under normal temperatures (for example, 10 to 20° C.) to high temperatures (for example, 30 to 50° C.). The amount D3 of change in the elastic modulus G' of the solid line A1 is smaller than the amount D4 of change in the elastic modulus G' of the dashed line A2. Thus, bubble formation and bubble growth in the laminated glass can be more effectively suppressed under normal temperatures to high temperatures in the case where the resin film shows the elastic modulus G' of the solid line A1 with a comparatively small amount D3 of change than in the case where the resin film shows the elastic modulus G' of the dashed line A2 with a comparatively large amount D4 of change in FIG. 3.

The G'(Tg+30) is preferably 200,000 Pa or higher. The G'(Tg+30) is more preferably 220,000 Pa or higher, still more preferably 230,000 Pa or higher, and particularly preferably 240,000 Pa or higher. Further, the G'(Tg+30) is preferably 10 million Pa or lower, more preferably 5 million Pa or lower, particularly preferably 1 million Pa or lower, more particularly preferably 500,000 Pa or lower, and still more particularly preferably 300,000 Pa or lower. If the G'(Tg+30) is equal to or higher than the above lower limit, bubble formation and bubble growth in the laminated glass can be even more effectively suppressed.

The relation between the elastic modulus G' and the temperature is greatly influenced by the kind of the polyvinyl acetal resin, particularly the average degree of polymerization of the polyvinyl alcohol resin used to obtain the polyvinyl acetal resin. The relation is not much influenced by the kind of the plasticizer, or the amount of the plasticizer used if it is a commonly used amount. The ratio (G'(Tg+170)/G'(Tg+30)) in the case of replacing the plasticizer 3GO with a plasticizer other than 3GO, such as a monobasic organic acid ester is not greatly different from the ratio (G'(Tg+170)/G'(Tg+30)) in the case of using 3GO. In particular, the ratio (G'(Tg+170)/G'(Tg+30)) in the case of using plasticizers of triethylene glycol di-2-ethylbutyrate (3 GH) and triethylene glycol di-n-heptanoate (3G7) is not greatly different from the ratio (G'(Tg+170)/G'(Tg+30)) in the case of using 3GO. Also, in the case where the amount of the plasticizer is 50 to 80 parts by weight for each 100 parts by weight of the polyvinyl acetal resin, the values of the ratio (G'(Tg+170)/G'(Tg+30)) are not greatly different. The ratio (G'(Tg+170)/G'(Tg+30)) determined using a resin film that contains 100 parts by weight of a polyvinyl acetal resin and 60 parts by weight of triethylene glycol di-2-ethylhexanoate (3GO) as a plasticizer is not largely different from the ratio (G'(Tg+170)/G'(Tg+30)) determined using the first layer 2 itself. The same applies to the ratio (G'(Tg+80)/G'(Tg+30)).

The ratio (G'(Tg+170)/G'(Tg+30)) determined is preferably 0.18 or higher in both test method A and test method B, and it is more preferable that the ratio (G'(Tg+170)/G'(Tg+30)) determined in test method B be 0.18 or higher. The ratio (G'(Tg+80)/G'(Tg+30)) determined is preferably 0.65 or higher in both test method A and test method B, and it is more preferable that the ratio (G'(Tg+80)/G'(Tg+30)) determined in test method B be 0.65 or higher. The ratio (G'(Tg+80)/G'(Tg+30)) determined in test method A may be lower than 0.65. The ratio (G'(Tg+80)/G'(Tg+30)) determined in test method B may be lower than 0.65. Both of the ratio (G'(Tg+

80)/G'(Tg+30)) determined in test method A and the ratio (G'(Tg+80)/G'(Tg+30)) determined in test method B may be lower than 0.65.

In the case where the amount of the plasticizer for each 100 parts by weight of the polyvinyl acetal resin in the first layer 2 is 50 parts by weight or higher, the sound insulation of the laminated glass can be sufficiently increased.

The following will explain the details of each component contained in the first layer, the second layer, and the third layer in the interlayer film 1.

(Polyvinyl Acetal Resin)

In the case where the first layer, the second layer, and the third layer each contain a polyvinyl acetal resin and a plasticizer, the layers each can have high adhesion. As a result, the adhesion of the interlayer film to the components for the laminated glass can be further enhanced. The polyvinyl acetal resin may be a polyvinyl acetal resin not modified with carboxylic acid, or may be a polyvinyl acetal resin modified with carboxylic acid (carboxylic acid-modified polyvinyl acetal resin). The "polyvinyl acetal resin" herein includes a polyvinyl acetal resin not modified with carboxylic acid and a carboxylic acid-modified polyvinyl acetal resin.

The polyvinyl acetal resin can be produced by acetalizing a polyvinyl alcohol resin with aldehyde. The polyvinyl acetal resin is one which can be obtained by acetalizing a polyvinyl alcohol resin. The carboxylic acid-modified polyvinyl acetal resin can be produced by acetalizing a carboxylic acid-modified polyvinyl alcohol resin with aldehyde.

In terms of enhancing the dispersibility of the compound having a boron atom, or further suppressing bubble formation and bubble growth in the laminated glass, the compound having a boron atom is preferably added upon acetalization of the polyvinyl alcohol resin.

In terms of further suppressing bubble formation and bubble growth in the laminated glass, the polyvinyl acetal resin in the first layer is preferably prepared by acetalizing a polyvinyl alcohol resin having an average degree of polymerization of 1500 or more. In terms of further suppressing bubble formation and bubble growth in the laminated glass, the polyvinyl acetal resin in the first layer is preferably prepared by acetalizing a polyvinyl alcohol resin having an average degree of polymerization of higher than 3000.

In terms of even further suppressing bubble formation and bubble growth in the laminated glass, the lower limit of the average degree of polymerization of the polyvinyl alcohol resin used to obtain the polyvinyl acetal resin in the first layer is preferably 1600, more preferably 1700, still more preferably 1800, particularly preferably 1900, and most preferably 2000, whereas the upper limit of the average degree of polymerization is preferably 7000, preferably 6000, preferably 5000, preferably 4900, and preferably 4500. Moreover, in order to further suppress bubble formation and bubble growth in the laminated glass, the lower limit of the average degree of polymerization of the polyvinyl alcohol resin used to obtain the polyvinyl acetal resin in the first layer is preferably 3010, more preferably 3050, still more preferably 3500, further preferably 3600, particularly preferably 4000, and most preferably 4050. In particular, in terms of even further suppressing bubble formation and bubble growth in the laminated glass, sufficiently increasing the sound insulation of the laminated glass, and easily forming an interlayer film, the average degree of polymerization of the polyvinyl alcohol resin used to obtain the polyvinyl acetal resin in the first layer is preferably 3010 or higher, and more preferably 3020 or higher. The average degree is also preferably 4000 or lower, more preferably lower than 4000, still more preferably 3800 or lower, particularly preferably 3600 or lower, and most preferably 3500 or lower.

The present inventors have also found that if the average degree of polymerization of the polyvinyl alcohol resin used to obtain the polyvinyl acetal resin in the first layer is equal to or higher than the above lower limit, the ratios (G'(Tg+170)/G'(Tg+30)) in test method A and test method B can easily be set to values that satisfy the lower limit and the upper limit. Furthermore, the ratios (G'(Tg+80)/G'(Tg+30)) can easily be set to values that satisfy the lower limit and the upper limit.

In the present invention, the first layer may contain, as the polyvinyl acetal resin, only a polyvinyl acetal resin obtained by acetalizing a polyvinyl alcohol resin having an average degree of polymerization exceeding 3000, or may contain such a polyvinyl acetal resin obtained by acetalizing a polyvinyl alcohol resin having an average degree of polymerization exceeding 3000 in combination with another polyvinyl acetal resin. The another polyvinyl acetal resin may be a polyvinyl acetal resin (hereinafter also referred to as a "polyvinyl acetal resin Z") obtained by acetalizing a polyvinyl alcohol resin having an average degree of polymerization of 3000 or lower. In this case, the lower limit of the amount of the polyvinyl acetal resin obtained by acetalizing a polyvinyl alcohol resin having an average degree of polymerization exceeding 3000 relative to 100% by weight of the total amount of the polyvinyl acetal resin obtained by acetalizing a polyvinyl alcohol resin having an average degree of polymerization exceeding 3000 and the polyvinyl acetal resin Z is preferably 5% by weight, more preferably 50% by weight, still more preferably 70% by weight, and particularly preferably 90% by weight, whereas the upper limit thereof is preferably 100% by weight, and more preferably 95% by weight. In terms of even further suppressing bubble formation and bubble growth in the laminated glass, the another polyvinyl acetal resin is particularly preferably a polyvinyl acetal resin obtained by acetalizing a polyvinyl alcohol resin having a degree of polymerization exceeding 3000.

The average degree of polymerization of the polyvinyl alcohol resin is determined by a method based on JIS K6726 "Testing Methods for Polyvinyl alcohol."

The polyvinyl acetal resin in the second layer or the third layer can be produced by acetalizing a polyvinyl alcohol resin. The lower limit of the average degree of polymerization of the polyvinyl alcohol resin used to obtain the polyvinyl acetal resin in the second layer or the third layer is preferably 200, more preferably 500, still more preferably 1000, and particularly preferably 1500, whereas the upper limit of the average degree of polymerization is preferably 4000, more preferably 3500, still more preferably 3000, and particularly preferably 2500. If the average degree of polymerization is equal to or higher than the preferable lower limit, the penetration resistance of the laminated glass can be further increased. If the average degree of polymerization is equal to or lower than the preferable upper limit, formation of an interlayer film is facilitated. The second layer and the third layer may contain the carboxylic acid-modified polyvinyl acetal resin.

The average degree of polymerization of the polyvinyl alcohol resin used to obtain the polyvinyl acetal resin in the first layer is preferably higher than the average degree of polymerization of the polyvinyl alcohol resin used to obtain the polyvinyl acetal resin in the second layer or the third layer by preferably 500 or more, more preferably 800 or more, still more preferably 1000 or more, even more preferably 1300 or more, and particularly preferably 1800 or more.

The polyvinyl alcohol resin is obtained by, for example, saponifying polyvinyl acetate. The degree of saponification of the polyvinyl alcohol resin is generally within the range of 70 to 99.9 mol %, preferably within the range of 75 to 99.8 mol %, and more preferably within the range of 80 to 99.8 mol %.

The aldehyde is not particularly limited. Generally, a C1 to C10 aldehyde is suitably used. Examples of the C1 to C10 aldehyde include propionaldehyde, n-butyraldehyde, isobutyraldehyde, n-valeraldehyde, 2-ethylbutyraldehyde, n-hexyl aldehyde, n-octyl aldehyde, n-nonyl aldehyde, n-decyl aldehyde, formaldehyde, acetaldehyde, and benzaldehyde. Particularly, n-butyraldehyde, n-hexyl aldehyde, and n-valeraldehyde are preferable, and n-butyraldehyde is more preferable. Each of the above aldehydes may be used alone, or two or more of the aldehydes may be used in combination.

The polyvinyl acetal resin is preferably a polyvinyl butyral resin. The polyvinyl acetal resin in each of the first layer, the second layer and the third layer preferably contains a polyvinyl butyral resin. Polyvinyl butyral resins can be easily synthesized. Moreover, use of polyvinyl butyral resin contributes to even more appropriate adhesion of the interlayer film to the components for laminated glass. Further, the use leads to a further enhancement of the properties such as light resistance and weatherability.

The lower limit of the hydroxy group content (the amount of the hydroxy group) of the polyvinyl acetal resin in the first layer, which is an intermediate layer, is preferably 16 mol %, more preferably 18 mol %, still more preferably 20 mol %, and particularly preferably 22 mol %, whereas the upper limit of the hydroxy group content is preferably 30 mol %, more preferably 29 mol %, still more preferably 27 mol %, and particularly preferably 25 mol %. If the hydroxy group content is equal to or higher than the preferable lower limit, the first layer can provide even higher adhesion. If the hydroxy group content is equal to or lower than the preferable upper limit, the laminated glass can provide even higher sound insulation. Further, the interlayer film can have higher flexibility, and can therefore show even higher handling properties.

If the hydroxy group content of the polyvinyl acetal resin is low, the hydrophilicity of the polyvinyl acetal resin is low. Hence, the amount of the plasticizer used can be increased and, as a result, the sound insulation of the laminated glass can be further increased. If the hydroxy group content of the polyvinyl acetal resin in the first layer is lower than the hydroxy group content of the polyvinyl acetal resin in each of the second layer and the third layer, the amount of the plasticizer in the first layer can be increased. In terms of further increase in the sound insulation of the laminated glass, the hydroxy group content of the polyvinyl acetal resin in the first layer is lower than the hydroxy group content of the polyvinyl acetal resin in each of the second layer and the third layer by preferably 2 mol % or more, more preferably 4 mol % or more, still more preferably 6 mol % or more, and particularly preferably 8 mol % or more.

The lower limit of the hydroxy group content of the polyvinyl acetal resin in each of the second layer and the third layer, which are surface layers, is preferably 26 mol %, more preferably 27 mol %, still more preferably 28 mol %, particularly preferably 29 mol %, and more particularly preferably 30 mol %, whereas the upper limit of the hydroxy group content is preferably 35 mol %, more preferably 34 mol %, still more preferably 33 mol %, particularly preferably 32 mol %, and most preferably 31.5 mol %. If the hydroxy group content is equal to or higher than the preferable lower limit, the interlayer film 1 can provide even higher adhesion. Further, if the hydroxy group content is equal to or lower than the preferable upper limit, the interlayer film can have higher flexibility, and can therefore show even higher handling properties.

The hydroxy group content of the polyvinyl acetal resin is a molar fraction, represented in percentage (mol %), obtained by dividing the amount of ethylene group having the hydroxy group bonded thereto by the total amount of the ethylene groups in the main chain. The amount of ethylene group having the hydroxy group bonded thereto can be determined by, for example, determining the amount of ethylene group having the hydroxy group bonded thereto in the polyvinyl acetal resin in accordance with the method based on JIS K6728 "Testing Methods for Polyvinyl butyral."

The degree of acetylation (the amount of acetyl groups) of the polyvinyl acetal resin in the first layer is preferably 30 mol % or lower. If the degree of acetylation exceeds 30 mol %, the reaction efficiency in production of a polyvinyl acetal resin may decrease.

The lower limit of the degree of acetylation of the polyvinyl acetal resin in the first layer is preferably 0.1 mol %, more preferably 0.5 mol %, and still more preferably 0.8 mol %, whereas the upper limit of the degree of acetylation is preferably 24 mol %, more preferably 20 mol %, still more preferably 19.5 mol %, and particularly preferably 15 mol %. The lower limit of the degree of acetylation of the polyvinyl acetal resin in each of the second layer or the third layer is preferably 0.1 mol %, more preferably 0.5 mol %, and still more preferably 0.8 mol %, whereas the upper limit of the degree of acetylation is preferably 20 mol %, more preferably 5 mol %, still more preferably 2 mol %, and particularly preferably 1.5 mol %. If the degree of acetylation is equal to or higher than the preferable lower limit, the compatibility of the polyvinyl acetal resin and the plasticizer is further increased. If the degree of acetylation is equal to or lower than the preferable upper limit, the moisture resistance of the interlayer film can be further increased. In terms of further increase in sound insulation of the laminated glass, if the degree of acetalization of the polyvinyl acetal resin in the first layer is lower than the degree of acetalization of the polyvinyl acetal resin in each of the second layer and the third layer, the degree of acetylation of the polyvinyl acetal resin in the first layer is higher than the degree of acetylation of the polyvinyl acetal resin in each of the second layer and the third layer by preferably 3 mol % or more, more preferably 5 mol % or more, still more preferably 7 mol % or more, and particularly preferably 10 mol % or more.

The degree of acetylation is obtained below. The amount of ethylene groups having the acetal group bonded thereto and the amount of the ethylene groups having the hydroxyu group bonded thereto are subtracted from the total amount of ethylene groups in the main chain. The obtained value is divided by the total amount of ethylene groups in the main chain. The obtained mole fraction expressed as percentage is the degree of acetylation. The amount of ethylene having the acetal group bonded thereto can be determined based on JIS K6728 "Testing Methods for Polyvinyl butyral."

The lower limit of the degree of acetalization of the polyvinyl acetal resin in the first layer is preferably 50 mol %, more preferably 54 mol %, still more preferably 58 mol %, and particularly preferably 60 mol %, whereas the upper limit of the degree of acetalization is preferably 85 mol %, more preferably 80 mol %, and still more preferably 79 mol %. The lower limit of the degree of acetalization of the polyvinyl acetal resin in each of the second layer and the third layer is preferably 60 mol %, more preferably 65 mol %, still more preferably 66 mol %, and particularly preferably 67 mol %, whereas the upper limit of the degree of acetalization is preferably 75 mol %, more preferably 72 mol %, still more preferably 71 mol %, and particularly preferably 70 mol %. If the degree of acetalization is equal to or higher than the preferable lower limit, the compatibility of the polyvinyl acetal resin and the plasticizer can be further increased. If the degree of acetalization is equal to or lower than the preferable upper limit, the reaction time required to produce a polyvinyl acetal resin can be shortened. In terms of further increase in sound insulation of the laminated glass, if the absolute value of the difference between the degree of acetylation of the polyvinyl acetal resin in the first layer and the degree of acetylation of the polyvinyl acetal resin in each of the second layer and the third layer is 3 or less, the degree of acetalization of the polyvinyl acetal resin in the first layer is higher than the degree of acetalization of the polyvinyl acetal resin in each of the second layer and the third layer by preferably 3 mol % or more, more preferably 5 mol % or more, still more preferably 7 mol % or more, and particularly preferably 10 mol % or more.

The degree of acetalization is a molar fraction, represented in percentage (mol %), determined by dividing the amount of ethylene group having the acetal group bonded thereto by the total amount of ethylene groups in the main chain.

The degree of acetalization is calculated by first measuring the amounts of the acetyl group and the vinyl alcohol (hydroxy group content) based on JIS K6728 "Testing Methods for Polyvinyl butyral," calculating the molar fraction from the measured amounts, and subtracting the amounts of the acetyl group and the vinyl alcohol from 100 mol %.

In the case where the polyvinyl acetal resin is a polyvinyl butyral resin, the degree of acetalization (degree of butyralization) and the degree of acetylation are calculated from the results measured by a method based on JIS K6728 "Testing Methods for Polyvinyl butyral," or a method based on ASTM D1396-92. The measurement by a method based on ASTM D1396-92 is preferred.

Moreover, in terms of further suppressing bubble formation and bubble growth in the laminated glass and further increasing the sound insulation of the laminated glass, the polyvinyl acetal resin in the first layer is preferably a polyvinyl acetal resin having a degree of acetylation of lower than 8 mol % (hereinafter also referred to as "polyvinyl acetal resin A") or a polyvinyl acetal resin having a degree of acetylation of 8 mol % or higher (hereinafter also referred to as "polyvinyl acetal resin B").

The degree a of acetylation of the polyvinyl acetal resin A is lower than 8 mol %, preferably 7.5 mol % or lower, preferably 7 mol % or lower, preferably 6 mol % or lower, and preferably 5 mol % or lower. The degree a of acetylation is preferably 0.1 mol % or higher, preferably 0.5 mol % or higher, preferably 0.8 mol % or higher, preferably 1 mol % or higher, preferably 2 mol % or higher, preferably 3 mol % or higher, and preferably 4 mol % or higher. If the degree a of acetylation satisfies the preferable lower limit to the preferable upper limit, the compatibility of the polyvinyl acetal resin A and the plasticizer can be further increased, and the sound insulation of the laminated glass can therefore be further increased.

The lower limit of the degree a of acetalization of the polyvinyl acetal resin A is 68 mol %, more preferably 70 mol %, still more preferably 71 mol %, and particularly preferably 72 mol %. The upper limit of the degree a of acetalization is preferably 85 mol %, more preferably 83 mol %, still more preferably 81 mol %, and particularly preferably 79 mol %. If the degree a of acetalization is equal to or higher than the lower limit, the sound insulation of the laminated glass can be further increased. If the degree a of acetalization is equal to or lower than the upper limit, the reaction time required to produce the polyvinyl acetal resin A can be shortened.

The hydroxy group content a of the polyvinyl acetal resin A is preferably 30 mol % or lower, preferably 27.5 mol % or lower, preferably 27 mol % or lower, preferably 26 mol % or lower, preferably 25 mol % or lower, preferably 24 mol % or lower, and preferably 23 mol % or lower. The hydroxy group content a is preferably 16 mol % or higher, preferably 18 mol % or higher, preferably 19 mol % or higher, and preferably 20 mol % or higher. If the hydroxy group content a is equal to or lower than the upper limit, the sound insulation of the laminated glass can be further increased. If the hydroxy group content a is equal to or higher than the lower limit, the adhesion of the interlayer film can be further increased.

The polyvinyl acetal resin A is preferably a polyvinyl butyral resin.

The degree b of acetylation of the polyvinyl acetal resin B is 8 mol % or higher, preferably 9 mol % or higher, preferably 10 mol % or higher, preferably 11 mol % or higher, and preferably 12 mol % or higher. The degree b of acetylation is preferably 30 mol % or lower, preferably 28 mol % or lower, preferably 26 mol % or lower, preferably 24 mol % or lower, preferably 20 mol % or lower, and preferably 19.5 mol % or lower. If the degree b of acetylation is equal to or higher than the lower limit, the sound insulation of the laminated glass can be further increased. If the degree b of acetylation is equal to or lower than the upper limit, the reaction time required to produce the polyvinyl acetal resin B can be shortened. In terms of further shortening the reaction time required to produce the polyvinyl acetal resin B, the degree b of acetylation of the polyvinyl acetal resin B is preferably lower than 20 mol %.

The lower limit of the degree b of acetalization of the polyvinyl acetal resin B is 50 mol %, more preferably 52.5 mol %, still more preferably 54 mol %, and particularly preferably 60 mol %. The upper limit of the degree b of acetalization is preferably 80 mol %, more preferably 77 mol %, still more preferably 74 mol %, and particularly preferably 71 mol %. If the degree b of acetalization is equal to or higher than the lower limit, the sound insulation of the laminated glass can be further increased. If the degree b of acetalization is equal to or lower than the upper limit, the reaction time required to produce the polyvinyl acetal resin B can be shortened.

The hydroxy group content b of the polyvinyl acetal resin B is preferably 30 mol % or lower, preferably 27.5 mol % or lower, preferably 27 mol % or lower, preferably 26 mol % or lower, and preferably 25 mol % or lower. The hydroxy group content b is preferably 18 mol % or higher, preferably 20 mol % or higher, preferably 22 mol % or higher, and preferably 23 mol % or higher. If the hydroxy group content b is equal to or lower than the upper limit, the sound insulation of the laminated glass can be further increased. If the hydroxy group content b is equal to or higher than the lower limit, the adhesion of the interlayer film can be further increased.

The polyvinyl acetal resin B is preferably a polyvinyl butyral resin.

The polyvinyl acetal resin A and the polyvinyl acetal resin B each are preferably obtained by acetalizing, with an aldehyde, a polyvinyl alcohol resin having an average degree of polymerization of 1500 or higher. The aldehyde is preferably a C1 to C10 aldehyde, and is more preferably a C4, or C5 aldehyde. The lower limit of the average degree of polymerization of the polyvinyl alcohol resin and the polyvinyl acetal resin B is preferably 1600, preferably 1700, preferably 1800, preferably 1900, preferably 2000, and preferably 2100. The upper limit of the average degree of polymerization is preferably 7000, preferably 6000, preferably 5000, preferably 4900, and preferably 4500. The polyvinyl acetal resin in the first layer is particularly preferably obtained by acetalizing a polyvinyl alcohol resin having an average degree of polymerization exceeding 3000 but lower than 4000.

The molecular-weight distribution ratio (weight-average molecular weight Mw/number-average molecular weight Mn) of the polyvinyl acetal resin in the first layer is generally 1.1 or higher, preferably 1.2 or higher, and more preferably 2 or higher, whereas the molecular-weight distribution ratio is preferably 6.7 or lower, more preferably 6.5 or lower, and still more preferably 3.4 or lower.

The lower limit of the molecular-weight distribution ratio of the polyvinyl acetal resin in the first layer is preferably 1.2, more preferably 1.5, still more preferably 2.0, and particularly preferably 2.5, whereas the upper limit is preferably 5.5, more preferably 5, still more preferably 4.6, and particularly preferably 3.2. The molecular-weight distribution ratio of the polyvinyl acetal resin in the first layer is particularly preferably 2.5 to 3.2. The molecular-weight distribution ratio represents the ratio of the weight-average molecular weight Mw of the polyvinyl acetal resin in the first layer to the number-average molecular weight Mn of the polyvinyl acetal resin in the first layer. The present inventors have also found that, if the molecular-weight distribution ratio of the polyvinyl acetal resin in the first layer satisfies the preferable lower limit and the preferable upper limit or is 2.5 to 3.2, the ratio (G'(Tg+170)/G'(Tg+30)) and the ratio (G'(Tg+80)/G'(Tg+30)) in the aforementioned test method A and test method B are easily set to satisfy the range from the lower limit to the upper limit. Furthermore, bubble formation and bubble growth in the laminated glass can be further efficiently suppressed. In particular, in terms of more effectively suppressing bubble formation and bubble growth in the laminated glass and further increasing the sound insulation of the laminated glass, it is preferable that the molecular-weight distribution ratio of the polyvinyl acetal resin in the first layer be 6.5 or lower, and the amount of the plasticizer for each 100 parts by weight of the polyvinyl acetal resin in the first layer be 50 parts by weight or more. In particular, in the case where the polyvinyl acetal resin in the first layer contains the polyvinyl acetal resin B, it is preferable that the molecular-weight distribution ratio of the polyvinyl acetal resin B be 6.5 or lower, and the amount of the plasticizer for each 100 parts by weight of the polyvinyl acetal resin in the first layer be preferably 55 parts by weight or more.

The weight-average molecular weight and the number-average molecular weight respectively represent the polystyrene-equivalent weight-average molecular weight and number-average molecular weight determined by gel permeation chromatography (GPC). For example, in order to determine the polystyrene-equivalent weight-average molecular weight and number-average molecular weight, GPC measurement of the polystyrene standard samples of which the molecular weights are known is performed. The polystyrene standard samples used ("Shodex Standard SM-105" and "Shodex Standard SH-75" produced by Showa Denko K.K.) are 14 samples having weight-average molecular weights of 580, 1260, 2960, 5000, 10100, 21000, 28500, 76600, 196000, 630000, 1130000, 2190000, 3150000, and 3900000. An approximation straight line, obtained by plotting the molecular weights relative to the elution times shown by the peak tops of the respective standard sample peaks, can be used as a calibration curve. The surface layers (the second layer and the third layer) and the intermediate layer (the first layer) are separated from the multilayered interlayer film that has been left to stand in a constant temperature and humidity room (humidity: 30% (±3%), temperature: 23° C.) for one month. The separated first layer (intermediate layer) is dissolved in tetrahydrofuran (THF) so that 0.1% by weight of a solution is prepared. The solution is analyzed with a GPC device to determine the weight-average molecular weight and the number-average molecular weight thereof. The GPC device used to determine the weight-average molecular weight and the number-average molecular weight may be a GPC device (produced by Hitachi High-technologies Corporation, "R1: L2490, autosampler: L-2200, pump: L-2130, column oven: L-2350, column: GL-A120-S and GL-A100MX-S in series") to which a light scattering detector for GPC ("Model 270 (RALS+VISCO)" produced by VISCOTEK) is connected.

In terms of further suppressing bubble formation and bubble growth in the laminated glass and obtaining a laminated glass with excellent sound insulation, the polyvinyl acetal resin contained in the first layer is preferably a carboxylic acid-modified polyvinyl acetal resin, and more preferably a carboxylic acid-modified polyvinyl butyral resin. Use of the carboxylic acid-modified polyvinyl acetal resin enables to easily set the ratio (G'(Tg+170)/G'(Tg+30)) in test method A or test method B to a value that satisfies the lower limit and the upper limit, and also enables to easily set the ratio (G'(Tg+80)/G'(Tg+30)) in test method A or test method B to a value that satisfies the lower limit and the upper limit. The present inventors have found that bubble formation and bubble growth in a laminated glass can be more efficiently suppressed by use of a carboxylic acid-modified polyvinyl acetal resin.

The carboxylic acid-modified polyvinyl acetal resin includes an ethylene group having an acetal group, an ethylene group having an acetyl group, an ethylene group having a hydroxy group, and an ethylene group modified with carboxylic acid. Examples of the carboxylic acid include unsaturated dicarboxylic acids and saturated tricarboxylic acids. The carboxylic acid is preferably an unsaturated dicarboxylic acid such as maleic acid and itaconic acid. The ratio of the ethylene group having an acetal group, the ethylene group having an acetyl group, the ethylene group having the hydroxy group, and the carboxylic acid-modified ethylene structural unit is not particularly limited. However, if a total amount of all the ethylene structural units is set to 100 mol %, the amount of the carboxylic acid-modified ethylene structural unit is more than 0 mol %, preferably 10 mol % or less, preferably 9 mol % or less, preferably 8 mol % or less, preferably 7 mol % or less, preferably 6 mol % or less, preferably 5 mol % or less, preferably 4 mol % or less, preferably 3 mol % or less, preferably 2 mol % or less, and preferably 1 mol % or less.

(Plasticizer)

The plasticizer in each of the first layer, the second layer and the third layer is not particularly limited. The plasticizer may be a publicly known plasticizer. One plasticizer may be used or two or more plasticizers may be used in combination as the above plasticizer.

Examples of the plasticizer include organic ester plasticizers such as monobasic organic acid ester plasticizers and polybasic organic acid ester plasticizers, and phosphorus plasticizers such as organic phosphorus acid plasticizers and organic phosphorous acid plasticizers. Among these, organic ester plasticizers are preferable. The plasticizer is preferably a liquid plasticizer.

Examples of the monobasic organic acid ester include, but not particularly limited to, glycol esters obtained through the reaction of glycol and a monobasic organic acid, and esters of monobasic organic acid and triethylene glycol or tripropylene glycol. Examples of the glycol include triethylene glycol, tetraethylene glycol, and tripropylene glycol. Examples of the monobasic organic acid include butyric acid, isobutyric acid, caproic acid, 2-ethylbutyric acid, heptylic acid, n-octyl acid, 2-ethylhexyl acid, n-nonylic acid, and decylic acid.

Examples of the polybasic organic acid ester include, but not particularly limited to, ester compounds of a polybasic organic acid and a C4 to C8 straight or branched chain alcohol. Examples of the polybasic organic acid include adipic acid, sebacic acid, and azelaic acid.

Examples of the organic ester plasticizer include, but not particularly limited to, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctylazelate, dibutylcarbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexylcyclohexyl adipate, a mixture of heptyl adipate and nonyl adipate, diisononyl adipate, diisodecyl adipate, heptyl nonyl adipate, dibutyl sebacate, oil-modified alkyd sebacate, and a mixture of phosphate and adipate. An organic ester plasticizer other than these may be used. An adipate other than the above adipates may be used.

Examples of the organic phosphoric acid plasticizer include, but not particularly limited to, tributoxyethyl phosphate, isodecyl phenyl phosphate, and triisopropyl phosphate.

The plasticizer is preferably a diester plasticizer represented by the following formula (I). The use of a diester plasticizer can further increase the sound insulation of the laminated glass.

[Chem. 1]

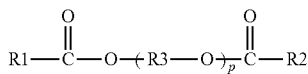

Formula (1)

In formula (1), R1 and R2 each represent a C5 to C10 organic group, R3 represents an ethylene group, an isopropylene group, or an n-propylene group, and p represents an integer of 3 to 10. R1 and R2 in formula (I) each preferably represent a C6 to C10 organic group.

The plasticizer preferably contains at least one compound selected from the group consisting of triethylene glycol di-2-ethylbutyrate (3 GH), triethylene glycol di-2-ethylhexanoate (3GO) and triethylene glycol di-n-heptanoate (3G7), and more preferably contains triethylene glycol di-2-ethylhexanoate. The plasticizer in each of the first layer, the second layer and the third layer preferably includes at least one compound selected from the group consisting of triethylene glycol di-2-ethylbutyrate, triethylene glycol di-2-ethylhexanoate, and triethylene glycol di-n-heptanoate. Use of these preferable plasticizers can further increase the sound insulation of the laminated glass.

The amount of the plasticizer in each layer of the interlayer film is not particularly limited.

In terms of sufficiently increasing the sound insulation of the laminated glass, the amount of the plasticizer for each 100 parts by weight of the polyvinyl acetal resin in the first layer is preferably 40 parts by weight or more. Even if the amount of the plasticizer in the first layer is large, by allowing the first layer to have a structure satisfying the ratio (G'(Tg+170)/G'(Tg+30)) of 0.18 or higher, bubble formation and bubble growth in the laminated glass can be suppressed.

The lower limit of the amount of the plasticizer for each 100 parts by weight of the polyvinyl acetal resin in the first layer is preferably 40 parts by weight, more preferably 45 parts by weight, still more preferably 50 parts by weight, particularly preferably 55 parts by weight, and most preferably 60 parts by weight, whereas the upper limit of the amount of the plasticizer is preferably 80 parts by weight, preferably 78 parts by weight, still more preferably 75 parts by weight, and particularly preferably 70 parts by weight. The lower limit of the amount of the plasticizer for each 100 parts by weight of the polyvinyl acetal resin that has been obtained by acetalizing a polyvinyl alcohol resin having an average degree of polymerization of more than 3000 is preferably 40 parts by weight, more preferably 45 parts by weight, still more preferably 50 parts by weight, particularly preferably 55 parts by weight, and most preferably 60 parts by weight, whereas the upper limit of the amount of the plasticizer is preferably 80 parts by weight, more preferably 78 parts by weight, still more preferably 75 parts by weight, and particularly preferably 70 parts by weight. If the amount of the plasticizer is equal to or higher than the preferable lower limit, the penetration resistance of the laminated glass can be further increased. The higher the amount of the plasticizer in the first layer is, the more the sound insulation of the laminated glass can be increased. If the amount of the plasticizer is equal to or lower than the preferable upper limit, the transparency of the laminated glass can be further increased.

The lower limit of the amount of the plasticizer for each 100 parts by weight of the polyvinyl acetal resin in the second layer and the third layer is preferably 25 parts by weight, more preferably 30 parts by weight, and still more preferably 35 parts by weight, whereas the upper limit of the amount of the plasticizer is preferably 50 parts by weight, more preferably 45 parts by weight, still more preferably 40 parts by weight, and particularly preferably 39 parts by weight. If the amount of the plasticizer is equal to or higher than the lower limit, the adhesion of the interlayer film can be further enhanced, and the penetration resistance of the laminated glass can be further increased. If the amount of the plasticizer is equal to or lower than the upper limit, the transparency of the laminated glass can be further increased.

In terms of further increasing the sound insulation of the laminated glass, the amount of the plasticizer for each 100 parts by weight of the polyvinyl acetal resin in the first layer is preferably higher than the amount of the plasticizer for each 100 parts by weight of the polyvinyl acetal resin in the second layer or the third layer. In terms of even further increasing the sound insulation of the laminated glass, the amount of the plasticizer for each 100 parts by weight of the polyvinyl acetal resin in the first layer is higher than the amount of the plasticizer for each 100 parts by weight of the polyvinyl acetal resin in the second layer or the third layer preferably by 5 parts by weight or more, more preferably by 10 parts by weight or more, still more preferably by 12 parts by weight or more, and particularly preferably by 15 parts by weight or more.

(Compound Having a Boron Atom)

In terms of further suppressing bubble formation and bubble growth in the laminated glass and obtaining a laminated glass with excellent sound insulation, the first layer preferably contains a compound having a boron atom. The compound having a boron atom is not particularly limited, and examples thereof include metaborate, tetraborate, boric acid, and boric acid esters. In terms of further suppressing bubble formation and bubble growth in the laminated glass, and obtaining a laminated glass excellent in sound insulation, the compound having a boron atom is preferably metaborate, tetraborate, borate, boronic acid, and boronic acid ester.

Examples of the metaborate include lithium metaborate. Examples of the tetraborate include sodium tetraborate and potassium tetraborate. Examples of the boric acid esters include n-butylboronic acid, n-hexylboronic acid, tri-n-octylborate, trioctadecyl boronic acid, 2-isopropyl-4,4,5,5-tetramethyl-1,3,2-dioctaborolane, triisopropyl borate, tri-n-propyl borate, and tri-n-butyl borate.

In terms of even further suppressing bubble formation and bubble growth in the laminated glass and obtaining a laminated glass with excellent sound insulation, the compound having a boron atom preferably contains at least one selected from the group consisting of lithium metaborate, sodium tetraborate, potassium tetraborate, boric acid, n-butylboronic acid, n-hexyl-octylborate, tri-n-octylborate, trioctadecylboronic acid, 2-isopropyl-4,4,5,5-tetramethyl-1,3,2-dioctaborolane, triisopropyl borate, tri-n-propyl borate, and tri-n-butyl borate. In terms of even further suppressing bubble formation and bubble growth in the laminated glass and obtaining a laminated glass with excellent sound insulation, the compound having a boron atom preferably contains at least one selected from the group consisting of lithium metaborate, sodium tetraborate, potassium tetraborate, and boric acid.

The molecular weight of the compound having a boron atom is not particularly limited, and is preferably 1000 or less, and more preferably 500 or less.

The compound having a boron atom is preferably added in the resin. Examples of the method for adding the compound having a boron atom to the resin include a method including adding a solution of the compound having a boron atom in a solvent to a resin during the acetalization for obtaining the polyvinyl acetal resin; and a method including mixing the compound having a boron atom with a solvent or a surfactant, and adding the mixture to the resin. The compound having a boron atom may be added in the resin for obtaining the polyvinyl acetal resin, or may be added in the polyvinyl acetal resin. The compound having a boron atom may be directly added in the resin, or may be first dissolved in a solvent, and then the solution is added in the resin. Alternatively, a mixture of the compound having a boron atom and a solvent or a surfactant may be added in the resin. Use of the solvent or the surfactant enables to more uniformly disperse the compound having a boron atom in the resin. Moreover, uniform dispersion of the compound having a boron atom in the resin facilitates extrusion molding of layers in the interlayer film.

Examples of the solvent include pure water, alcohol, plasticizers, polyalkylene polyol, polyalkylene glycol alkyl ether, and polyalkylene glycol aryl ether. For example, the polyalkylene polyol is preferably tetraethylene glycol. The polyalkylene glycol alkyl ether is preferably tetraethylene glycol phenyl ether. The polyalkylene glycol aryl ether is preferably polyalkylene glycol phenyl ether.

Examples of the surfactant include polyalkylene glycol alkyl ether and polyalkylene glycol aryl ether. For example, the polyalkylene glycol alkyl ether is preferably polyethylene glycol alkyl ether. The polyalkylene glycol aryl ether is preferably polyethylene glycol phenyl ether. Polyalkylene glycol alkyl ether or polyalkylene glycol aryl ether is preferable among the examples because it enables more uniform dispersion of the compound having a boron atom.

The lower limit of the amount of the surfactant for each 100 parts by weight of the polyvinyl acetal resin in the first layer is preferably 0.1 parts by weight, more preferably 1 part by weight, still more preferably 5 parts by weight, and particularly preferably 10 parts by weight, whereas the upper limit of the amount of the surfactant is preferably 50 parts by weight, more preferably 40 parts by weight, still more preferably 30 parts by weight, particularly preferably 20 parts by weight, and most preferably 15 parts by weight. If the amount of the surfactant is equal to or higher than the preferable lower limit, the compound having a boron atom can be more uniformly dispersed in the resin. If the amount of the surfactant is equal to or lower than the preferable upper limit, the penetration resistance of the laminated glass can be further increased.

The lower limit of a total of the amount of plasticizer for each 100 parts by weight of the polyvinyl acetal resin in the first layer and the amount of the surfactant for each 100 parts by weight of the polyvinyl acetal resin in the first layer is preferably 45 parts by weight, more preferably 50 parts by weight, still more preferably 55 parts by weight, and particularly preferably 60 parts by weight, whereas the upper limit of the total amount is preferably 85 parts by weight, more preferably 80 parts by weight, still more preferably 75 parts by weight, and particularly preferably 70 parts by weight. If the total amount is equal to or higher than the preferable lower limit, the sound insulation of the laminated glass can be further increased. If the total amount is equal to or lower than the preferable upper limit, the penetration resistance of the laminated glass can be further increased.

The lower limit of the amount of the compound having a boron atom for each 100 parts by weight of the polyvinyl acetal resin in the first layer is preferably 0.01 parts by weight, more preferably 0.05 parts by weight, and still more preferably 0.1 parts by weight, whereas the upper limit of the amount of the compound having a boron atom is preferably 5 parts by weight, more preferably 1 part by weight, and still more preferably 0.5 parts by weight. If the amount of the compound having a boron atom is equal to or higher than the preferable lower limit, bubble formation and bubble growth in the laminated glass can be even further suppressed. If the amount of the compound having a boron atom is equal to or lower than the preferable upper limit, the transparency of the laminated glass can be further increased.

The lower limit of the amount of the boron atom in the first layer is preferably 1 ppm, preferably 2 ppm, preferably 5 ppm, preferably 10 ppm, preferably 15 ppm, and preferably 20 ppm, whereas the upper limit of the amount of the boron atom is preferably 10000 ppm, preferably 5000 ppm, preferably 3000 ppm, preferably 1000 ppm, preferably 900 ppm, preferably 800 ppm, preferably 700 ppm, preferably 600 ppm, preferably 500 ppm, preferably 400 ppm, preferably 300 ppm, preferably 200 ppm, preferably 100 ppm, and preferably 50 ppm. If the amount of the boron atom is equal to or higher than the preferable lower limit, bubble formation and bubble growth in the laminated glass can be even further suppressed. If the amount of the boron atom is equal to or lower than the preferable upper limit, the interlayer film for a laminated glass can be easily formed. Meanwhile, the boron atom in the first layer herein refers to not only boron atoms derived from the compound having a boron atom but also boron atoms included in the interlayer film for a laminated glass according to the present invention. The amount of the boron atom in the first layer can be measured by ICP-optical emission spectrometry.

(Other Components)

The first layer, the second layer, and the third layer of the interlayer film each may contain additives such as an ultraviolet ray absorbent, an antioxidant, a light stabilizer, a flame retardant, an antistatic agent, a pigment, a dye, an adhesion regulator, a moisture resistant agent, a fluorescent bleach, and an infrared absorbent.

(Method of Producing Interlayer Film for Laminated Glass, and Laminated Glass)

Examples of the method of producing an interlayer film for a laminated glass according to the present invention include, but not particularly limited to, a method of forming each of the first layer, the second layer and the third layer using resin compositions each containing the polyvinyl acetal resin and the plasticizer and, for example, laminating the second layer, the first layer, and the third layer in the stated order; and a method of co-extruding these resin compositions with an extruder to laminate the second layer, the first layer, and the third layer in the stated order. In terms of excellent production efficiency of the interlayer film, the second layer and the third layer each preferably contain the same polyvinyl acetal resin. The second layer and the third layer each more preferably contain the same polyvinyl acetal resin and the same plasticizer. Still more preferably, the second layer and the third layer are formed of the same resin composition.

In terms of enhancing the dispersibility of the compound having a boron atom, or further suppressing bubble formation and bubble growth in the laminated glass, the composition for forming the first layer preferably contains the compound having a boron atom.

Each interlayer film for a laminated glass according to the present invention is used to obtain a laminated glass.

Figure 2:
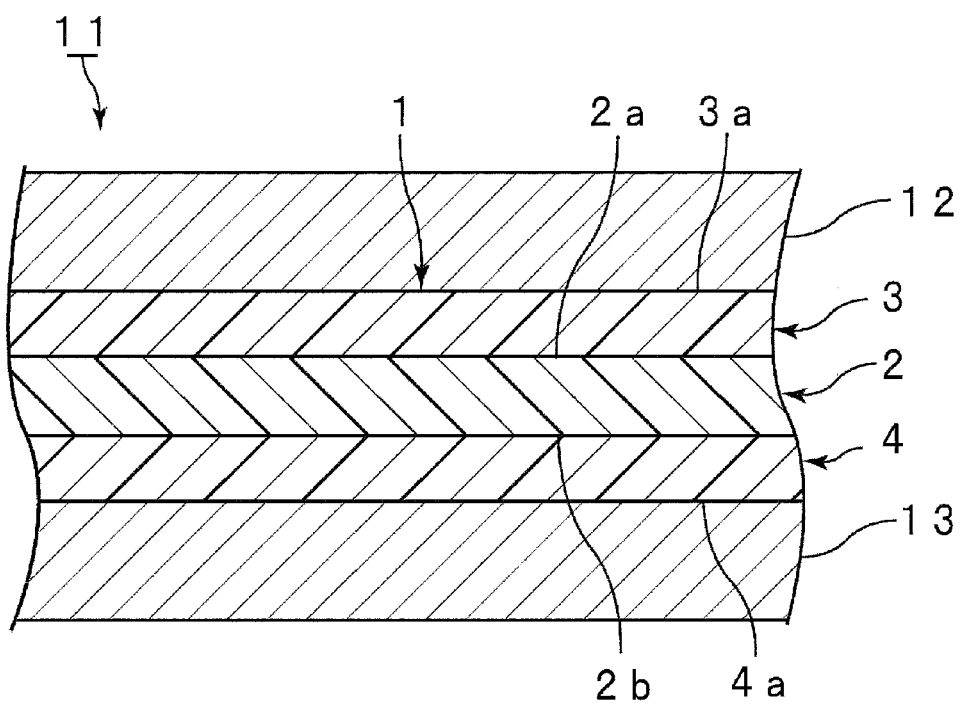
FIG. 2 is a cross-sectional view schematically illustrating one example of a laminated glass including the interlayer film for a laminated glass illustrated in FIG. 1.

FIG. 2 is a cross-sectional view schematically illustrating one example of a laminated glass including the interlayer film 1 in FIG. 1.

A laminated glass 11 in FIG. 2 includes a first component for laminated glass 12, a second component for laminated glass 13, and the interlayer film 1. The interlayer film 1 is sandwiched between the first component for laminated glass 12 and the second component for laminated glass 13.

The first component for laminated glass 12 is laminated on an outer surface 3a of the second layer 3. The second component for laminated glass 13 is laminated on an outer surface 4a of the third layer 4. Therefore, the laminated glass 11 has the first component for laminated glass 12, the second layer 3, the first layer 2, the third layer 4, and the second component for laminated glass 13 which are laminated in the stated order.

Examples of the first component for laminated glass and the second component for laminated glass include glass plates and PET (polyethylene terephthalate) films. The laminated glass encompasses not only a laminated glass having an interlayer film sandwiched between two glass plates but also a laminated glass having an interlayer film sandwiched between a glass plate and a PET film. A laminated glass is a laminated product provided with glass plate(s). A laminated glass preferably has at least one glass plate.

Examples of the glass plate include inorganic glass and organic glass. Examples of the inorganic glass include float plate glass, heat absorbing plate glass, heat reflecting glass, polished plate glass, molded plate glass, wire plate glass, and lined plate glass. The organic glass is a synthetic resin glass substituted for inorganic glass. Examples of the organic glass include polycarbonate plates and poly(meth)acrylic resin plates. Examples of the poly(meth)acrylic resin plate include polymethyl(meth)acrylate plates.

In terms of further increasing the penetration resistance of the laminated glass, the lower limit of the thickness of the interlayer film is preferably 0.05 mm, and more preferably 0.25 mm, whereas the upper limit of the thickness is preferably 3 mm, and more preferably 1.5 mm. If the thickness of the interlayer film satisfies the preferable lower limit and the preferable upper limit, the penetration resistance and the transparency of the laminated glass can be further increased. The lower limit of the thickness of the first layer is preferably 0.01 mm, more preferably 0.04 mm, and still more preferably 0.07 mm, whereas the upper limit of the thickness is preferably 0.3 mm, more preferably 0.2 mm, still more preferably 0.18, and particularly preferably 0.16 mm. If the thickness of the first layer is equal to or larger than the lower limit, the sound insulation of the laminated glass can be further increased. If the thickness is equal to or smaller than the upper limit, the transparency of the laminated glass can be further increased. The lower limit of the thickness of each of the second layer and the third layer is preferably 0.1 mm, more preferably 0.2 mm, still more preferably 0.25 mm, and particularly preferably 0.3 mm, whereas the upper limit of the thickness is preferably 0.6 mm, more preferably 0.5 mm, still more preferably 0.45, and particularly preferably 0.4 mm. If the thickness of each of the second layer and the third layer is equal to or larger than the lower limit, the penetration resistance of the laminated glass can be further increased. If the thickness is equal to or smaller than the upper limit, the transparency of the laminated glass can be further increased. A smaller ratio of the thickness of the first layer to the thickness of the interlayer film ((thickness of the first layer)/(thickness of the interlayer film)) and a larger amount of the plasticizer in the first layer tend to cause bubble formation and bubble growth in the laminated glass more. Particularly in the case where the ratio in the interlayer film is 0.05 to 0.35 and the amount of the plasticizer for each 100 parts by weight of the polyvinyl acetal resin in the first layer is 55 parts by weight or more, bubble formation and bubble growth in the laminated glass including the interlayer film for a laminated glass according to the present invention can be sufficiently suppressed, and the sound insulation of the laminated glass can be further increased. The lower limit of the ratio (thickness of the first layer)/(thickness of the interlayer film)) is preferably 0.06, more preferably 0.07, still more preferably 0.08, and particularly preferably 0.1, whereas the upper limit is preferably 0.3, more preferably 0.25, still more preferably 0.2, and particularly preferably 0.15.

The thickness of each of the first component for laminated glass and the second component for laminated glass is preferably 0.5 mm or larger, and more preferably 1 mm or larger. The thickness is also preferably 5 mm or smaller, and more preferably 3 mm or smaller. If the components for laminated glass are glass plates, the thickness of each glass plate is preferably within the range of 1 to 3 mm. If the components for laminated glass are PET films, the thickness of each PET film is preferably within the range of 0.03 to 0.5 mm.

The method of producing a laminated glass is not particularly limited. For example, sandwiching the interlayer film between the first component for laminated glass and the second component for laminated glass, and then removing the air remaining between the interlayer film and the first component for laminated glass and the second component for laminated glass by pressing the resulting product by pressure rollers, or putting the product in a rubber bag for vacuum-sucking. Then, the product is pre-bonded at about 70° C. to 110° C. to obtain a laminate. Next, the laminate is put into an autoclave or is pressed, so as to be pressure-bonded at about 120° C. to 150° C. and 1 to 1.5 MPa. Thus, the laminated glass can be obtained.

The laminated glass can be widely used for vehicles, rail cars, aircrafts, boats and ships, buildings, and the like. The laminated glass can be used in applications other than these uses. The laminated glass is preferably for buildings or for vehicles, and more preferably for vehicles. The laminated glass can be used for windshields, side glass, rear glass, roof glass of vehicles, or the like.

Hereinafter, the present invention will be described in more detail based on Examples. The present invention is not limited to these Examples.

In Examples and Comparative Examples, a polyvinyl butyral resin (polyvinyl acetal resin) mentioned below was used. The degree of butyralization (degree of acetalization), the degree of acetylation and the hydroxy group content of the polyvinyl butyral resin were measured in accordance with the method based on ASTM D1396-92. Meanwhile, the results measured in accordance with the method based on JIS K6728 "Testing Methods for Polyvinyl butyral" were substantially the same as the results measured in accordance with the method based on D1396-92.

Example 1

(1) Production of Multilayered Interlayer Film

To 100 parts by weight of a polyvinyl butyral resin (hydroxy group content: 23.4 mol %, degree of acetylation: 12.5 mol %, degree of butyralization: 64.4 mol %) prepared by butyralization of a polyvinyl alcohol resin having an average degree of polymerization of 2310 with n-butyl aldehyde were added 60 parts by weight of triethylene glycol di-2-ethylhexanoate (3GO) as a plasticizer and 0.12 parts by weight of sodium tetraborate. The mixture was sufficiently kneaded by a mixing roll, so that a resin composition for an intermediate layer was obtained.

To 100 parts by weight of polyvinyl butyral resin (hydroxy group content: 30.9 mol %, degree of acetylation: 0.8 mol %, degree of butyralization: 68.3 mol %) prepared by butyralization of a polyvinyl alcohol resin having an average degree of polymerization of 1700 with n-butyl aldehyde was added 37.5 parts by weight of triethylene glycol di-2-ethylhexanoate (3GO) as a plasticizer. The mixture was sufficiently kneaded by a mixing roll, so that a resin composition for a surface layer was obtained.

The resin composition for an intermediate layer and the resin composition for a surface layer were co-extruded by an extruder to give a multilayered interlayer film in which a surface layer (thickness: 350 μm), an intermediate layer (thickness: 100 μm), and a surface layer (thickness: 350 μm) were laminated in the stated order.

(2) Production of Laminated Glass Used for Penetration Resistance Test

The obtained multilayered interlayer film was cut into a size of 30 cm (length)×30 cm (width). Next, the multilayered interlayer film was sandwiched between two sheets of transparent float glass (30 cm (length)×30 cm (width)×2.5 mm (thickness)), and thereby a laminate was obtained. The laminate was put into a rubber bag and deaerated for 20 minutes at the degree of vacuum of 2.6 kPa. The deaerated product was put into an oven to further stand at 90° C. for 30 minutes for vacuum-pressing, so that the laminate was pressure-bonded in advance. The preliminary pressure-bonded laminate was pressure-bonded in an autoclave at 135° C. and a pressure of 1.2 MPa for 20 minutes. Thereby, a laminated glass to be used for a penetration resistance test was obtained.

(3) Production of Laminated Glass Used for Sound Insulation Measurement

A laminated glass to be used for sound insulation measurement was produced by the same procedure as that for obtaining a laminated glass to be used for a penetration resistance test, except that the multilayered interlayer film was cut into a size of 30 cm (length)×2.5 cm (width) and each sheet of the transparent float glass had a size of 30 cm (length)×2.5 cm (width)×2.5 mm (thickness).

(4) Production of Laminated Glass Used for Bubble Formation Test (Laminated Glass Used for Bubble Formation Test in Test Method A)

The obtained multilayered interlayer film was cut into a size of 30 cm (length)×15 cm (width), and the cut-out film was left to stand at 23° C. for 10 hours. Here, both faces of the obtained multilayered interlayer film were embossed, and the ten-point height of irregularities of the embossing was 30 μm. In the cut-out multilayered interlayer film, four through holes having a diameter of 6 mm were respectively formed at four points of intersections each at 8 cm inward from an end of the multilayered interlayer film in the lengthwise direction and 5 cm inward from an end of the multilayered interlayer film in the transverse direction. As a result, a multilayered interlayer film having through holes was obtained.

The multilayered interlayer film having through holes was sandwiched between two sheets of transparent float glass (30 cm (length)×15 cm (width)×2.5 mm (thickness)), so that a laminate was obtained. The periphery of the laminate was sealed 2 cm from the end by thermal fusion bonding to encapsulate the air remaining in the embossed parts and in the through holes. The resulting laminate was pressure-bonded at 135° C. and a pressure of 1.2 MPa for 20 minutes, so that the remaining air was mixed into the multilayered interlayer film. Thereby, a laminated glass to be used for a bubble formation test was obtained.

(Laminated Glass Used for Bubble Formation Test in Test Method B)

A laminated glass to be used for the bubble formation test in test method B was obtained by the same procedure as that for obtaining a laminated glass to be used for the bubble formation test in test method A, except that no through hole was formed in the multilayered interlayer film.

(Laminated Glass Used for Bubble Formation Test in Test Method C)

A laminated glass to be used for the bubble formation test in test method C was obtained by the same procedure as that for obtaining a laminated glass to be used for the bubble formation test in test method A.

Examples 2 to 4 and Comparative Examples 1 to 4

Interlayer films and sheets of laminated glass were produced in the same manner as in Example 1, except that the compositions of the first layer, the second layer and the third layer and the average degrees of polymerization of the polyvinyl alcohol resins or the carboxylic acid-modified polyvinyl alcohol resins used to obtain the polyvinyl acetal resins or the carboxylic acid-modified polyvinyl acetal resins for the first layer were changed to the values shown in the following Table 1.

In Example 4, an interlayer film and a laminated glass were produced in the same manner as in Example 1, except that the resin composition for an intermediate layer contained a carboxylic acid-modified polyvinyl butyral resin (average degree of polymerization: 1800, hydroxy group content: 21.3 mol %, degree of acetylation: 12.6 mol %, degree of butyralization: 64.9 mol %, proportion of carboxylic acid modification: 1.2 mol %) in place of the polyvinyl butyral resin, and the formulations for each of the first layer, the second layer and the third layer were changed to those shown in Table 1. The polyvinyl butyral resins contained in the respective resin compositions for a surface layer in Examples 2 to 4 and Comparative Examples 1 to 4 each were obtained by acetalizing a polyvinyl alcohol resin having an average degree of polymerization of 1700.

Example 5

A mixed solution containing 10 parts by weight of polyethylene glycol alkyl ether ("SANNONIC SS-70" produced by Sanyo Chemical Industries Ltd.) as a surfactant A and 0.0125 parts by weight of lithium metaborate as a compound having a boron atom was combined with 50 parts by weight of triethylene glycol di-2-ethylhexanoate (3GO) as a plasticizer. The resulting mixture was sufficiently mixed so that a plasticizer-dispersed mixture was prepared. The whole plasticizer-dispersed mixture was added to 100 parts by weight of a polyvinyl butyral resin (hydroxy group content: 23 mol %, degree of acetylation: 12.5 mol %, degree of butyralization: 64.5 mol %) prepared by butyralization of a polyvinyl alcohol resin having an average degree of polymerization of 2300 with n-butyl aldehyde, and then sufficiently kneaded with a mixing roll so that a resin composition for an intermediate layer was obtained.

To 100 parts by weight of polyvinyl butyral resin (hydroxy group content: 30.4 mol %, degree of acetylation: 0.8 mol %, degree of butyralization: 68.8 mol %) prepared by butyralization of a polyvinyl alcohol resin having an average degree of polymerization of 1700 with n-butyl aldehyde was added 38.5 parts by weight of triethylene glycol di-2-ethylhexanoate (3GO) as a plasticizer. The mixture was sufficiently kneaded by a mixing roll, and thereby a resin composition for a surface layer was obtained.

The resin composition for an intermediate layer and the resin composition for a surface layer were co-extruded by an extruder to give a multilayered interlayer film in which a surface layer (thickness: 350 μm), an intermediate layer (thickness: 100 μm), and a surface layer (thickness: 350 μm) were laminated in the stated order.

A laminated glass to be used for a penetration resistance test, a laminated glass to be used for sound insulation measurement, and a laminated glass to be used for bubble formation test were produced in the same manner as in Example 1. The bubble formation test was performed according to test method C.

Examples 6 to 57 and Comparative Examples 5 to 6

Interlayer films and sheets of laminated glass were produced in the same manner as in Example 5, except that the formulations of the plasticizer-dispersed mixtures, formulations of the first layer, the second layer and the third layer, and the average degrees of polymerization, as well as the degree of butyralization, degree of acetylation, and hydroxy group content of the polyvinyl alcohol resin used to obtain the polyvinyl acetal resin for the first layer, the second layer and the third layer were changed to the values shown in the following Tables 2 to 7.

Polyethylene glycol alkyl ether ("SANNONIC SS-70" produced by Sanyo Chemical Industries Ltd.) was used as the surfactant A; polyethylene glycol alkyl ether ("NAROACTY CL-40" produced by Sanyo Chemical Industries Ltd.) was used as a surfactant B; and polyethylene glycol phenyl ether (produced by DAI-ICHI KOGYO SEIYAKU CO., LTD) was used as surfactant C.

(Evaluation)
(1) Sound Insulation

The laminated glass was vibrated with a vibration generator for a dumping test ("Vibration generator G21-005D" produced by Shinken Co., Ltd.). The vibration characteristics obtained thereby were amplified with a mechanical impedance measuring device ("XG-81" produced by Rion), and the vibration spectrum was analyzed with an FFT spectrum analyzer ("FFT analyzer HP3582A" produced by YOKOGAWA Hewlett-Packard, Ltd.).

Based on the ratio of the loss coefficient determined thereby and the resonance frequency with the laminated glass, a graph showing the relation between sound frequency (Hz) and sound transmission loss (dB) at 20° C. was plotted, and the minimum sound transmission loss (TL value) around the sound frequency of 2,000 Hz was determined. A higher TL value indicates higher sound insulation. A TL value of 35 dB or higher was evaluated as "o", and a TL value of lower than 35 dB was evaluated as "x".

(2) Bubble Formation State (Test Method A and Test Method B)

Five sheets of the laminated glass for a bubble formation test were produced for each multilayered interlayer film, and were left to stand in a 50° C. oven for 100 hours. After the standing, the sheets of the laminated glass were observed by eye in a plan view for the presence or absence of bubbles and the sizes of the bubbles (test method A). Another five sheets of the laminated glass for a bubble formation test were produced for each multilayered interlayer film, and were left to stand in a 50° C. oven for 30 days. After the standing, the sheets of the laminated glass were observed by eye in a plan view for the presence or absence of bubbles and the sizes of the bubbles (test method B). From the observation results, the bubble formation state was determined based on the following criteria.

[Criteria of Bubble Formation State]

The bubbles in each of the five sheets of the laminated glass were approximated with an ellipse, and the ellipse area was set to the bubble formation area. The average value of the ellipse areas observed in the respective five sheets of the laminated glass was determined, and the proportion (percentage) of the average value of the ellipses areas (bubble formation areas) to the area of the sheet of the laminated glass (30 cm×15 cm) was determined.

oo: No bubble was observed in all the five sheets of the laminated glass o: Proportion of average value of ellipse area (bubble formation area) was lower than 5%

Δ: Proportion of average value of ellipse area (bubble formation area) was 5% or higher and lower than 10% x: Proportion of average value of ellipse area (bubble formation area) was 10% or higher (3) Bubble Formation State (Test Method C)

Five sheets of the laminated glass for a bubble formation test were produced for each multilayered interlayer film, and were left to stand in a 60° C. oven for 50 hours. After the standing, the sheets of the laminated glass were observed by eye in a plan view for the presence or absence of bubbles and the sizes of the bubbles (test method C). From the observation results, the bubble formation state was determined based on the following criteria.

[Criteria of Bubble Formation State]

The bubbles in each of the five sheets of the laminated glass were approximated with an ellipse, and the ellipse area was set to the bubble formation area. The average value of the ellipse areas observed in the respective five sheets of the laminated glass was determined, and the proportion (percentage) of the average value of the ellipses areas (bubble formation areas) to the area of the sheet of the laminated glass (30 cm×15 cm) was determined.

oo: No bubble was observed in all the five sheets of the laminated glass o: Proportion of average value of ellipse area (bubble formation area) was lower than 3%

Δ: Proportion of average value of ellipse area (bubble formation area) was 3% or higher and lower than 5% x: Proportion of average value of ellipse area (bubble formation area) was 5% or higher (4) Penetration Resistance The surface temperature of sheets of the laminated glass (30 cm (length)×30 cm (width)) used for the penetration resistance test was adjusted to 23° C. Subsequently, according to JIS R 3212, a rigid sphere having a mass of 2260 g and a diameter of 82 mm was dropped from a height of 4 m on the center of each of six sheets of the laminated glass. The laminated glass was considered to have passed the test if all the six sheets of the laminated glass prevented the rigid sphere from penetrating therethrough within five seconds after the rigid sphere hit the sheets. The laminated glass was considered to have failed the test if three or less sheets of the laminated glass prevented the rigid sphere from penetrating therethrough within five seconds after the rigid sphere hit the sheets. In the case of four sheets, another six sheets of the laminated glass were tested again on the penetration resistance. In the case of five sheets, another sheet of the laminated glass was tested. The glass was considered to have passed the test if the other sheet prevented the rigid sphere from penetrating therethrough within five seconds after the rigid sphere hit the sheet. In the same way, a rigid sphere having a mass of 2260 g and a diameter of 82 mm was dropped from heights of 5 m and 6 m on the center of each of six sheets of the laminated glass to evaluate the penetration resistance of the laminated glass.

(5) Measurement of Elastic Modulus G' by Test Method A

An amount of 100 parts by weight of the polyvinyl acetal resin (polyvinyl acetal resin used for the first layer) in the first layer of the interlayer film for a laminated glass in each of the Examples and Comparative Examples was mixed with 60 parts by weight of triethylene glycol di-2-ethylhexanoate (3GO) as a plasticizer. The mixture was sufficiently kneaded so that a kneaded product was obtained. The kneaded product was press-molded in a pressing machine to give a resin film A having an average thickness of 0.35 mm. The resin film A was left to stand at 25° C. and a relative humidity of 30% for two hours. After the two hours of standing, the viscoelasticity of the resin film was measured with ARES-G2 produced by TAINSTRUMENTS. Here, a parallel plate of 8 mm in diameter was used as a geometry. The measurement was performed under the conditions of the temperature being decreased from 100° C. to −10° C. at a temperature dropping speed of 3° C./min., the frequency of 1 Hz, and the distortion of 1%. The peak temperature of the loss factor resulting from the measurement was set to the glass transition temperature Tg(° C.). From the measurement results and the glass transition temperature Tg, the elastic modulus G'(Tg+30) at (Tg+30)° C., the elastic modulus G'(Tg+80) at (Tg+80)° C., and the elastic modulus G'(Tg+170) at (Tg+170)° C. were determined. Further, the ratio (G'(Tg+170)/G'(Tg+30)) and the ratio (G'(Tg+80)/G'(Tg+30)) were calculated. In Examples 5 to 20 and Comparative Examples 5 to 6, only the ratio (G'(Tg+170)/G'(Tg+30)) was calculated.

(6) Measurement of Elastic Modulus G' by Test Method B

The interlayer films for a laminated glass of the respective Examples and Comparative Examples were stored in a constant temperature and humidity room (humidity: 30% (±3%), temperature: 23° C.) for one month. Immediately after the end of the one-month storage, the surface layers were separated from the intermediate layer to leave the intermediate layer. In a mold (2 cm in length×2 cm in width×0.76 mm in thickness) arranged between two polyethylene terephthalate (PET) films, 1 g of the separated intermediate layer was placed. The resulting product was pre-heated at 150° C. and a pressing pressure of 0 kg/cm² for 10 minutes, and then press-molded at 80 kg/cm² for 15 minutes. The press-molded intermediate layer was put in a hand presser the temperature of which was set to 20° C. in advance, and the layer was pressed at 10 MPa for 10 minutes for cooling. Subsequently, one PET film was removed from the mold arranged between two PET films, and was stored in a constant temperature and humidity room (humidity: 30% (±3%), temperature: 23° C.) for 24 hours. After that, the viscoelasticity of the film was measured with ARES-G2 produced by TAINSTRUMENTS. Here, a parallel plate of 8 mm in diameter was used as a geometry. The measurement was performed under the conditions of the temperature being decreased from 100° C. to −10° C. at a temperature dropping speed of 3° C./min., the frequency of 1 Hz, and the distortion of 1%. The peak temperature of the loss factor resulting from the measurement was set to the glass transition temperature Tg(° C.). From the measurement results and the glass transition temperature Tg, the elastic modulus G'(Tg+30) at (Tg+30)° C., the elastic modulus G'(Tg+80) at (Tg+80)° C., and the elastic modulus G'(Tg+170) at (Tg+170)° C. were determined. Further, the ratio (G'(Tg+170)/G'(Tg+30)) and the ratio (G'(Tg+80)/G'(Tg+30)) were calculated. In Examples 5 to 20 and Comparative Examples 5 to 6, only the ratio (G'(Tg+170)/G'(Tg+30)) was calculated.

Tables 1 to 7 below show the results. In Tables 1 to 7, 3GO and 3G7, which are kinds of plasticizer, respectively represent triethylene glycol di-2-ethylhexanoate and triethylene glycol di-n-heptanoate. Table 1 also shows the value of the molecular-weight distribution ratio (weight-average molecular weight Mw/number-average molecular weight Mn) of the polyvinyl acetal resin or carboxylic acid-modified polyvinyl acetal resin used for each first layer. The number-average molecular weight Mn of the polyvinyl acetal resin X used for each first layer was within the range of 50,000 to 500,000. The number-average molecular weight shows the polystyrene-equivalent number-average molecular weight measured by gel permeation chromatography (GPC).

TABLE 1

|  |  |  |  | Example 1 | Example 2 | Example 3 | Example 4 | Comparative Example 1 |
|---|---|---|---|---|---|---|---|---|
| Formulation of first layer Resin composition for | Polyvinyl butyral resin or acid-modified polyvinyl butyral resin | Average degree of polymerization of PVA |  | 2310 | 1715 | 3020 | 1800 | 1700 |
|  |  | Degree of butyralization | mol % | 64.4 | 78 | 64.3 | 64.9 | 79 |
|  |  | Degree of acetylation | mol % | 12.2 | 0.8 | 13.2 | 12.6 | 0.8 |
|  |  | Hydroxy group content | mol % | 23.4 | 21.2 | 22.5 | 21.3 | 20.2 |

TABLE 1-continued

| | | | | | | | | |
|---|---|---|---|---|---|---|---|---|
| intermediate layer | | Proportion of carboxylic acid modification | mol % | — | — | — | 1.2 | — |
| | | Amount | Parts by weight | 100 | 100 | 100 | 100 | 100 |
| | | Molecular-weight distribution ratio | | 3.2 | 3.1 | 2.8 | 3.2 | 3.6 |
| | Plasticizer | Kind | | 3GO | 3GO | 3GO | 3GO | 3GO |
| | | Amount | Parts by weight | 60 | 60 | 60 | 60 | 60 |
| | Sodium tetraborate | Amount | Parts by weight | 0.12 | 0.12 | 0.12 | — | — |
| | Boron content•boron atom concentration in the resin composition for intermediate layer | | ppm | 130 | 131 | 128 | — | — |
| Formulation of second and third layers Resin composition for surface layer | Polyvinyl butyral resin | Degree of butyralization | mol % | 68.3 | 68.3 | 68.3 | 68.3 | 68.8 |
| | | Degree of acetylation | mol % | 0.8 | 0.8 | 0.8 | 0.8 | 0.8 |
| | | Hydroxy group content | mol % | 30.9 | 30.9 | 30.9 | 30.9 | 30.4 |
| | | Amount | Parts by weight | 100 | 100 | 100 | 100 | 100 |
| | Plasticizer | Kind | | 3GO | 3GO | 3GO | 3GO | 3GO |
| | | Amount | Parts by weight | 37.5 | 37.5 | 37.5 | 37.5 | 37.5 |
| Evaluation | (1)Sound insulation: TL value | | | ○ | ○ | ○ | ○ | ○ |
| | (2)State of bubble formation in test method A | | | ○○ | ○○ | ○○ | ○○ | X |
| | (2)State of bubble formation in test method B | | | ○ | ○ | ○ | ○ | X |
| | (3)State of bubble formation in test method C | | | ○ | ○ | ○ | ○ | X |
| | (4)Penetration resistance | | 4 m | Passed | Passed | Passed | Passed | Passed |
| | | | 5 m | Passed | Passed | Passed | Passed | Passed |
| | | | 6 m | Passed | Passed | Passed | Passed | Passed |
| | (5)Test method A: Glass transition temperature (Tg) | | °C. | 0.1 | 2.4 | 2.0 | 1.2 | 2.4 |
| | (5)Test method A: G' (Tg + 30) | | Pa | 283600 | 279900 | 233100 | 242400 | 245000 |
| | (5)Test method A: G' (Tg + 80) | | Pa | 201700 | 190100 | 216000 | 169100 | 105000 |
| | (5)Test method A: G' (Tg + 80)/G' (Tg + 30) | | | 0.71 | 0.68 | 0.93 | 0.70 | 0.43 |
| | (5)Test method A: G' (Tg + 170) | | Pa | 164500 | 181900 | 209800 | 181800 | 9800 |
| | (5)Test method A: G' (Tg + 170)/G' (Tg + 30) | | | 0.58 | 0.65 | 0.90 | 0.75 | 0.04 |
| | (6)Test method B: Glass transition temperature (Tg) | | °C. | −8.9 | −3.6 | −6.0 | −7.8 | −4.6 |
| | (6)Test method B: G' (Tg + 30) | | Pa | 258600 | 253900 | 197100 | 230400 | 225000 |
| | (6)Test method B: G' (Tg + 80) | | Pa | 177400 | 168700 | 180300 | 155000 | 94200 |
| | (6)Test method B: G' (Tg + 80)/G' (Tg + 30) | | | 0.69 | 0.66 | 0.91 | 0.67 | 0.42 |
| | (6)Test method B: G' (Tg + 170) | | Pa | 152600 | 165000 | 175400 | 172800 | 9000 |
| | (6)Test method B: G' (Tg + 170)/G' (Tg + 30) | | | 0.59 | 0.65 | 0.89 | 0.75 | 0.04 |

| | | | | Comparative Example 2 | Comparative Example 3 | Comparative Example 4 |
|---|---|---|---|---|---|---|
| Formulation of first layer Resin composition for intermediate layer | Polyvinyl butyral resin or acid-modified polyvinyl butyral resin | Average degree of polymerization of PVA | | 1700 | 2500 | 2500 |
| | | Degree of butyralization | mol % | 79 | 79 | 79 |
| | | Degree of acetylation | mol % | 0.8 | 0.8 | 0.8 |
| | | Hydroxy group content | mol % | 20.2 | 20.2 | 20.2 |
| | | Proportion of carboxylic acid modification | mol % | — | — | — |
| | | Amount | Parts by weight | 100 | 100 | 100 |
| | | Molecular-weight distribution ratio | | 3.6 | 3.6 | 3.6 |
| | Plasticizer | Kind | | 3GO | 3GO | 3GO |
| | | Amount | Parts by weight | 70 | 70 | 60 |
| | Sodium tetraborate | Amount | Parts by weight | — | — | — |
| | Boron content•boron atom concentration in the resin composition for intermediate layer | | ppm | — | — | — |
| Formulation of second and third layers Resin composition for surface layer | Polyvinyl butyral resin | Degree of butyralization | mol % | 68.8 | 68.8 | 68.8 |
| | | Degree of acetylation | mol % | 0.8 | 0.8 | 0.8 |
| | | Hydroxy group content | mol % | 30.4 | 30.4 | 30.4 |
| | | Amount | Parts by weight | 100 | 100 | 100 |
| | Plasticizer | Kind | | 3GO | 3GO | 3GO |
| | | Amount | Parts by weight | 36.5 | 36.5 | 37.5 |
| Evaluation | (1)Sound insulation: TL value | | | ○ | ○ | ○ |
| | (2)State of bubble formation in test method A | | | X | X | X |
| | (2)State of bubble formation in test method B | | | X | X | X |
| | (3)State of bubble formation in test method C | | | X | X | X |

TABLE 1-continued

|  |  |  |  |  |  |
|---|---|---|---|---|---|
| (4)Penetration resistance |  | 4 m | Passed | Passed | Passed |
|  |  | 5 m | Passed | Passed | Passed |
|  |  | 6 m | Passed | Passed | Passed |
| (5)Test method A: Glass transition temperature (Tg) |  | ° C. | 2.4 | 2.4 | 2.4 |
| (5)Test method A: G' (Tg + 30) |  | Pa | 245000 | 221500 | 221500 |
| (5)Test method A: G' (Tg + 80) |  | Pa | 105000 | 137900 | 137900 |
| (5)Test method A: G' (Tg + 80)/G' (Tg + 30) |  |  | 0.43 | 0.62 | 0.62 |
| (5)Test method A: G' (Tg + 170) |  | Pa | 8600 | 37700 | 35400 |
| (5)Test method A: G' (Tg + 170)/G' (Tg + 30) |  |  | 0.04 | 0.17 | 0.16 |
| (6)Test method B: Glass transition temperature (Tg) |  | ° C. | −6.6 | −3.6 | −5.6 |
| (6)Test method B: G' (Tg + 30) |  | Pa | 220000 | 195500 | 205500 |
| (6)Test method B: G' (Tg + 80) |  | Pa | 88800 | 118800 | 125500 |
| (6)Test method B: G' (Tg + 80)/G' (Tg + 30) |  |  | 0.40 | 0.61 | 0.61 |
| (6)Test method B: G' (Tg + 170) |  | Pa | 8800 | 33200 | 30800 |
| (6)Test method B: G' (Tg + 170)/G' (Tg + 30) |  |  | 0.04 | 0.17 | 0.15 |

※ Polyvinyl butyral resin is used in Examples 1 to 3 and Comparative Examples 1 to 7.
※ Carboxylic acid-modified polyvinyl butyral resin is used in Example 4.

TABLE 2

|  |  |  |  | Example 5 | Example 6 | Example 7 | Example 8 | Example 9 |
|---|---|---|---|---|---|---|---|---|
| Formulation of first layer Resin composition for intermediate layer | Polyvinyl butyral resin | Average degree of polymerization of PVA |  | 2300 | 2300 | 2300 | 2300 | 2300 |
|  |  | Degree of butyralization | mol % | 64.5 | 64.5 | 64.5 | 64.5 | 64.5 |
|  |  | Degree of acetylation | mol % | 12.5 | 12.5 | 12.5 | 12.5 | 12.5 |
|  |  | Hydroxy group content | mol % | 23 | 23 | 23 | 23 | 23 |
|  |  | Amount | Parts by weight | 100 | 100 | 100 | 100 | 100 |
|  | Plasticizer | Kind |  | 3GO | 3GO | 3GO | 3GO | 3GO |
|  |  | Amount | Parts by weight | 50 | 45 | 60 | 55 | 40 |
|  | Lithium metaborate |  | Parts by weight | 0.0125 | 0.0425 | — | — | — |
|  | Boronic acid |  | Parts by weight | — | — | 0.025 | 0.06 | 0.08 |
|  | Boron content•boron atom concentration in the resin composition for intermediate layer |  | ppm | 17 | 58 | 20 | 50 | 87 |
|  | Surfactant A | Amount | Parts by weight | 10 | 15 | 6 | 10 | 20 |
|  | Surfactant B | Amount | Parts by weight | — | — | — | — | — |
|  | Surfactant C | Amount | Parts by weight | — | — | — | — | — |
| Formulation of second and third layers Resin composition for surface layer | Polyvinyl butyral resin | Degree of butralization | mol % | 68.8 | 68.8 | 68.8 | 68.8 | 68.8 |
|  |  | Degree of acetylation | mol % | 0.8 | 0.8 | 0.8 | 0.8 | 0.8 |
|  |  | Hydroxy group content | mol % | 30.4 | 30.4 | 30.4 | 30.4 | 30.4 |
|  |  | Amount | Parts by weight | 100 | 100 | 100 | 100 | 100 |
|  | Plasticizer | Kind |  | 3GO | 3GO | 3GO | 3GO | 3GO |
|  |  | Amount | Parts by weight | 38.5 | 39.5 | 38.5 | 39.5 | 37.5 |
| Evaluation | (1)Sound insulation: TL value |  |  | ◯ | ◯ | ◯ | ◯ | ◯ |
|  | (3)State of bubble formation in test method C |  |  | ◯ | ◯◯ | ◯ | ◯◯ | ◯◯ |
|  | (4)Penetration resistance |  | 4 m | Passed | Passed | Passed | Passed | Passed |
|  |  |  | 5 m | Passed | Passed | Passed | Passed | Passed |
|  |  |  | 6 m | Passed | Passed | Passed | Passed | Passed |
|  | (5)G' (Tg + 30) |  |  | 233600 | 232700 | 245600 | 238700 | 239500 |
|  | (5)G' (Tg + 170) |  |  | 54700 | 101700 | 88400 | 119400 | 154400 |
|  | (5)G' (Tg + 170)/G' (Tg + 30) |  |  | 0.23 | 0.44 | 0.36 | 0.50 | 0.64 |
|  | (6)G' (Tg + 30) |  |  | 221600 | 217100 | 226800 | 226700 | 220700 |
|  | (6)G' (Tg + 170) |  |  | 48800 | 93400 | 79400 | 108800 | 139000 |
|  | (6)G' (Tg + 170)/G' (Tg + 30) |  |  | 0.22 | 0.43 | 0.35 | 0.48 | 0.63 |

|  |  |  |  |  | Example 10 | Example 11 | Example 12 | Example 13 |
|---|---|---|---|---|---|---|---|---|
|  | Formulation of first layer | Polyvinyl butyral resin | Average degree of polymerization of PVA |  | 2300 | 1700 | 1700 | 1700 |
|  |  |  | Degree of | mol % | 64.5 | 64.5 | 64.5 | 64.5 |

TABLE 2-continued

|  |  |  |  |  |  |  |  |
|---|---|---|---|---|---|---|---|
|  | Resin composition for intermediate layer |  | butyralization |  |  |  |  |
|  |  |  | Degree of acetylation | mol % | 12.5 | 12.5 | 12.5 | 12.5 |
|  |  |  | Hydroxy group content | mol % | 23 | 23 | 23 | 23 |
|  |  |  | Amount | Parts by weight | 100 | 100 | 100 | 100 |
|  |  | Plasticizer | Kind |  | 3GO | 3GO | 3GO | 3GO |
|  |  |  | Amount | Parts by weight | 30 | 40 | 35 | 20 |
|  |  | Lithium metaborate |  | Parts by weight | — | — | — | — |
|  |  | Boronic acid |  | Parts by weight | 0.2 | 0.08 | 0.16 | 0.32 |
|  |  | Boron content•boron atom concentration in the resin composition for intermediate layer |  | ppm | 220 | 87 | 175 | 350 |
|  |  | Surfactant A | Amount | Parts by weight | 30 | 20 | 25 | 40 |
|  |  | Surfactant B | Amount | Parts by weight | — | — | — | — |
|  |  | Surfactant C | Amount | Parts by weight | — | — | — | — |
|  | Formulation of second and third layers Resin composition for surface layer | Polyvinyl butyral resin | Degree of butralization | mol % | 68.8 | 68.8 | 68.8 | 68.8 |
|  |  |  | Degree of acetylation | mol % | 0.8 | 0.8 | 0.8 | 0.8 |
|  |  |  | Hydroxy group content | mol % | 30.4 | 30.4 | 30.4 | 30.4 |
|  |  |  | Amount | Parts by weight | 100 | 100 | 100 | 100 |
|  |  | Plasticizer | Kind |  | 3GO | 3GO | 3GO | 3GO |
|  |  |  | Amount | Parts by weight | 36.5 | 37.5 | 37 | 36 |
|  | Evaluation | (1)Sound insulation: TL value |  |  | ◯ | ◯ | ◯ | ◯ |
|  |  | (3)State of bubble formation in test method C |  |  | ◯◯ | ◯ | ◯◯ | ◯◯ |
|  |  | (4)Penetration resistance |  | 4 m | Passed | Passed | Passed | Passed |
|  |  |  |  | 5 m | Passed | Passed | Passed | Passed |
|  |  |  |  | 6 m | Passed | Passed | Passed | Passed |
|  |  | (5)G' (Tg + 30) |  |  | 237600 | 229400 | 241300 | 225400 |
|  |  | (5)G' (Tg + 170) |  |  | 208200 | 114100 | 196600 | 210700 |
|  |  | (5)G' (Tg + 170)/G' (Tg + 30) |  |  | 0.88 | 0.50 | 0.81 | 0.93 |
|  |  | (6)G' (Tg + 30) |  |  | 226100 | 217400 | 222800 | 209800 |
|  |  | (6)G' (Tg + 170) |  |  | 199000 | 108700 | 178200 | 197200 |
|  |  | (6)G' (Tg + 170)/G' (Tg + 30) |  |  | 0.88 | 0.50 | 0.80 | 0.94 |

TABLE 3

|  |  |  |  | Example 14 | Example 15 | Example 16 | Example 17 | Example 18 |
|---|---|---|---|---|---|---|---|---|
| Formulation of first layer Resin Composition for intermediate layer | Polyvinyl butyral resin | Average degree of polymerization of PVA |  | 1700 | 1700 | 2300 | 2300 | 2300 |
|  |  | Degree of butyralization | mol % | 64.5 | 64.5 | 64.5 | 64.5 | 79 |
|  |  | Degree of acetylation | mol % | 12.5 | 12.5 | 12.5 | 12.5 | 0.8 |
|  |  | Hydroxy group content | mol % | 23 | 23 | 23 | 23 | 20.2 |
|  |  | Amount | Parts by weight | 100 | 100 | 100 | 100 | 100 |
|  | Plasticizer | Kind |  | 3GO | 3GO | 3GO | 3GO | 3GO |
|  |  | Amount | Parts by weight | 35 | 30 | 42 | 35 | 50 |
|  | Lithium metaborate |  | Parts by weight | — | — | — | — | — |
|  | Boronic acid |  | Parts by weight | 0.08 | 0.16 | 0.06 | 0.12 | 0.06 |
|  | Boron content•boron atom concentration in the resin composition for intermediate layer |  | ppm | 85 | 165 | 50 | 100 | 50 |
|  | Surfactant A | Amount | Parts by weight | — | — | — | — | 10 |
|  | Surfactant B | Amount | Parts by weight | 25 | 30 | — | — | — |
|  | Surfactant C | Amount | Parts by weight | — | — | 18 | 25 | — |
| Formulation of second and | Polyvinyl butyral | Degree of butyralization | mol % | 68.8 | 68.8 | 68.8 | 68.8 | 68.8 |

TABLE 3-continued

| | | | | | | | | |
|---|---|---|---|---|---|---|---|---|
| third layers Resin composition for surface layer | resin | Degree of acetylation | mol % | 0.8 | 0.8 | 0.8 | 0.8 | 0.8 |
| | | Hydroxy group content | mol % | 30.4 | 30.4 | 30.4 | 30.4 | 30.4 |
| | | Amount | Parts by weight | 100 | 100 | 100 | 100 | 100 |
| | Plasticizer | Kind | | 3GO | 3GO | 3GO | 3GO | 3GO |
| | | Amount | Parts by weight | 36.5 | 37.5 | 36.5 | 37.5 | 38.5 |
| Evaluation | (1)Sound insulation: TL value | | | ○ | ○ | ○ | ○ | ○ |
| | (3)State of bubble formation in test method C | | | ○ | ○○ | ○○ | ○○ | ○○ |
| | (4)Penetration resistance | | 4 m | Passed | Passed | Passed | Passed | Passed |
| | | | 5 m | Passed | Passed | Passed | Passed | Passed |
| | | | 6 m | Passed | Passed | Passed | Passed | Passed |
| | (5)G' (Tg + 30) | | | 209300 | 205200 | 229800 | 247500 | 235900 |
| | (5)G' (Tg + 170) | | | 93800 | 153700 | 117200 | 168300 | 141500 |
| | (5)G' (Tg + 170)/G' (Tg + 30) | | | 0.45 | 0.75 | 0.51 | 0.68 | 0.60 |
| | (6)G' (Tg + 30) | | | 197300 | 193700 | 214200 | 235500 | 217400 |
| | (6)G' (Tg + 170) | | | 90800 | 147200 | 107100 | 157800 | 130400 |
| | (6)G' (Tg + 170)/G' (Tg + 30) | | | 0.46 | 0.76 | 0.50 | 0.67 | 0.60 |

| | | | | Example 19 | Example 20 | Comparative Example 5 | Comparative Example 6 |
|---|---|---|---|---|---|---|---|
| Formulation of first layer Resin Composition for intermediate layer | Polyvinyl butyral resin | Average degree of polymerization of PVA | | 2300 | 1700 | 1700 | 2300 |
| | | Degree of butyralization | mol % | 79 | 79 | 78.9 | 79.2 |
| | | Degree of acetylation | mol % | 1.2 | 0.8 | 1 | 0.8 |
| | | Hydroxy group content | mol % | 19.8 | 20.2 | 20.1 | 20 |
| | | Amount | Parts by weight | 100 | 100 | 100 | 100 |
| | Plasticizer | Kind | | 3GO | 3GO | 3GO | 3GO |
| | | Amount | Parts by weight | 40 | 45 | 60 | 60 |
| | Lithium metaborate | | Parts by weight | — | — | — | — |
| | Boronic acid | | Parts by weight | 0.12 | 0.09 | — | — |
| | Boron content·boron atom concentration in the resin composition for intermediate layer | | ppm | 100 | 75 | — | — |
| | Surfactant A | Amount | Parts by weight | 20 | 15 | — | — |
| | Surfactant B | Amount | Parts by weight | — | — | — | — |
| | Surfactant C | Amount | Parts by weight | — | — | — | — |
| Formulation of second and third layers Resin composition for surface layer | Polyvinyl butyral resin | Degree of butyralization | mol % | 68.8 | 68.8 | 68.5 | 68.5 |
| | | Degree of acetylation | mol % | 0.8 | 0.8 | 0.8 | 0.8 |
| | | Hydroxy group content | mol % | 30.4 | 30.4 | 30.7 | 30.7 |
| | | Amount | Parts by weight | 100 | 100 | 100 | 100 |
| | Plasticizer | Kind | | 3GO | 3GO | 3GO | 3GO |
| | | Amount | Parts by weight | 37.5 | 38 | 37.5 | 39.5 |
| Evaluation | (1)Sound insulation: TL value | | | ○ | ○ | ○ | ○ |
| | (3)State of bubble formation in test method C | | | ○○ | ○ | X | X |
| | (4)Penetration resistance | | 4 m | Passed | Passed | Passed | Passed |
| | | | 5 m | Passed | Passed | Passed | Passed |
| | | | 6 m | Passed | Passed | Passed | Passed |
| | (5)G' (Tg + 30) | | | 239100 | 220500 | 219800 | 238800 |
| | (5)G' (Tg + 170) | | | 153800 | 112000 | 10500 | 34600 |
| | (5)G' (Tg + 170)/G' (Tg + 30) | | | 0.64 | 0.51 | 0.05 | 0.14 |
| | (6)G' (Tg + 30) | | | 227000 | 204900 | 205600 | 228400 |
| | (6)G' (Tg + 170) | | | 145300 | 104500 | 10300 | 32000 |
| | (6)G' (Tg + 170)/G' (Tg + 30) | | | 0.64 | 0.51 | 0.05 | 0.14 |

TABLE 4

| | | | | Example 21 | Example 22 | Example 23 | Example 24 | Example 25 |
|---|---|---|---|---|---|---|---|---|
| Formulation of first | Polyvinyl butyral | Average degree of polymerization of PVA | | 2300 | 2300 | 2300 | 2300 | 2300 |

TABLE 4-continued

|  |  |  |  |  |  |  |  |  |
|---|---|---|---|---|---|---|---|---|
| layer Resin composition for intermediate layer | resin | Degree of butyralization | mol % | 64.5 | 64.5 | 64.5 | 64.5 | 64.5 |
|  |  | Degree of acetylation | mol % | 12.5 | 12.5 | 12.5 | 12.5 | 12.5 |
|  |  | Hydroxy group content | mol % | 23 | 23 | 23 | 23 | 23 |
|  |  | Amount | Parts by weight | 100 | 100 | 100 | 100 | 100 |
|  | Plasticizer | Kind |  | 3GO | 3GO | 3GO | 3GO | 3GO |
|  |  | Amount | Parts by weight | 60 | 60 | 60 | 60 | 60 |
|  | Compound having a boron atom | Kind |  | n-butylboronic acid | n-hexylboronic acid | tri-n-octyl borate | tri-n-octyl borate | tri-n-octyl borate |
|  |  | Amount | Parts by weight | 0.32 | 0.32 | 0.06 | 0.12 | 0.15 |
|  | Boron content•boron atom concentration in the resin composition for intermediate layer |  | ppm | 211 | 211 | 10 | 20 | 25 |
|  | Surfactant A | Amount | Parts by weight | — | — | — | — | — |
|  | Surfactant B | Amount | Parts by weight | — | — | — | — | — |
|  | Surfactant C | Amount | Parts by weight | — | — | — | — | — |
| Formulation of second and third layers Resin composition for surface layer | Polyvinyl butyral resin | Degree of butyralization | mol % | 69 | 69.5 | 70 | 69.8 | 68.4 |
|  |  | Degree of acetylation | mol % | 1 | 1.2 | 0.8 | 1.1 | 0.9 |
|  |  | Hydroxy group content | mol % | 30 | 29.3 | 29.2 | 29.1 | 30.7 |
|  |  | Amount | Parts by weight | 100 | 100 | 100 | 100 | 100 |
|  | Plasticizer | Kind |  | 3GO | 3GO | 3GO | 3GO | 3GO |
|  |  | Amount | Parts by weight | 37.5 | 37.5 | 37.5 | 37.5 | 37.5 |
| Evaluation | (1)Sound insulation: TL value |  |  | ◯ | ◯ | ◯ | ◯ | ◯ |
|  | (3)State of bubble formation in test method C |  |  | ◯ | ◯ | ◯◯ | ◯◯ | ◯◯ |
|  | (4)Penetration resistance |  | 4 m | Passed | Passed | Passed | Passed | Passed |
|  |  |  | 5 m | Passed | Passed | Passed | Passed | Passed |
|  |  |  | 6 m | Passed | Passed | Passed | Passed | Passed |
|  | (5)G' (Tg + 30) |  |  | 231020 | 228890 | 228831 | 236728 | 235071 |
|  | (5)G' (Tg + 170) |  |  | 47254 | 44436 | 54634 | 67950 | 65769 |
|  | (5)G' (Tg + 170)/G' (Tg + 30) |  |  | 0.20 | 0.19 | 0.24 | 0.29 | 0.28 |
|  | (5)G' (Tg + 80) |  |  | 143934 | 143472 | 141595 | 153549 | 155442 |
|  | (5)G' (Tg + 80)/G' (Tg + 30) |  |  | 0.62 | 0.63 | 0.62 | 0.65 | 0.66 |
|  | (6)G' (Tg + 30) |  |  | 231000 | 226000 | 225000 | 229000 | 232000 |
|  | (6)G' (Tg + 170) |  |  | 46200 | 40680 | 51750 | 64120 | 64960 |
|  | (6)G' (Tg + 170)/G' (Tg + 30) |  |  | 0.20 | 0.18 | 0.23 | 0.28 | 0.28 |
|  | (6)G' (Tg + 80) |  |  | 140910 | 140120 | 139500 | 146560 | 148480 |
|  | (6)G' (Tg + 80)/G' (Tg + 30) |  |  | 0.61 | 0.62 | 0.62 | 0.64 | 0.64 |

|  |  |  |  | Example 26 | Example 27 | Example 28 | Example 29 | Example 30 |
|---|---|---|---|---|---|---|---|---|
| Formulation of first layer Resin composition for intermediate layer | Polyvinyl butyral resin | Average degree of polymerization of PVA |  | 2300 | 2300 | 2300 | 2300 | 2300 |
|  |  | Degree of butyralization | mol % | 64.5 | 64.5 | 64.5 | 64.5 | 64.5 |
|  |  | Degree of acetylation | mol % | 12.5 | 12.5 | 12.5 | 12.5 | 12.5 |
|  |  | Hydroxy group content | mol % | 23 | 23 | 23 | 23 | 23 |
|  |  | Amount | Parts by weight | 100 | 100 | 100 | 100 | 100 |
|  | Plasticizer | Kind |  | 3GO | 3GO | 3GO | 3GO | 3GO |
|  |  | Amount | Parts by weight | 70 | 60 | 60 | 60 | 60 |
|  | Compound having a boron atom | Kind |  | trioctadecyl borate | trioctadecyl borate | troctadecyl borate | tri-n-octyl borate | tri-n-octyl borate |
|  |  | Amount | Parts by weight | 0.11 | 0.28 | 0.44 | 0.18 | 0.6 |
|  | Boron content•boron atom concentration in the resin composition for intermediate layer |  | ppm | 10 | 25 | 40 | 30 | 100 |
|  | Surfactant A | Amount | Parts by weight | — | — | — | — | — |
|  | Surfactant B | Amount | Parts by weight | — | — | — | — | — |
|  | Surfactant C | Amount | Parts by weight | — | — | — | — | — |

TABLE 4-continued

| | | | | | | | | |
|---|---|---|---|---|---|---|---|---|
| Formulation of second and third layers Resin composition for surface layer | Polyvinyl butyral resin | Degree of butyralization | mol % | 68.8 | 68.1 | 69 | 68.5 | 68 |
| | | Degree of acetylation | mol % | 0.7 | 0.8 | 0.9 | 0.8 | 1.2 |
| | | Hydroxy group content | mol % | 30.5 | 31.1 | 30.1 | 30.7 | 30.8 |
| | | Amount | Parts by weight | 100 | 100 | 100 | 100 | 100 |
| | Plasticizer | Kind | | 3GO | 3GO | 3GO | 3GO | 3GO |
| | | Amount | Parts by weight | 37.5 | 37.5 | 37.5 | 37.5 | 37.5 |
| Evaluation | (1)Sound insulation: TL value | | | ◯ | ◯ | ◯ | ◯ | ◯ |
| | (3)State of bubble formation in test method C | | | ◯◯ | ◯ | ◯◯ | ◯ | ◯ |
| | (4)Penetration resistance | | 4 m | Passed | Passed | Passed | Passed | Passed |
| | | | 5 m | Passed | Passed | Passed | Passed | Passed |
| | | | 6 m | Passed | Passed | Passed | Passed | Passed |
| | (5)G' (Tg + 30) | | | 233516 | 221845 | 235930 | 245000 | 238000 |
| | (5)G' (Tg + 170) | | | 53377.9 | 78785.1 | 98166 | 95550 | 180880 |
| | (5)G' (Tg + 170)/G' (Tg + 30) | | | 0.23 | 0.36 | 0.42 | 0.39 | 0.76 |
| | (5)G' (Tg + 80) | | | 141651 | 146805 | 160709 | 171500 | 195160 |
| | (5)G' (Tg + 80)/G' (Tg + 30) | | | 0.61 | 0.66 | 0.68 | 0.7 | 0.82 |
| | (6)G' (Tg + 30) | | | 231000 | 220000 | 234000 | 234000 | 229000 |
| | (6)G' (Tg + 170) | | | 53130 | 79200 | 95940 | 88920 | 171750 |
| | (6)G' (Tg + 170)/G' (Tg + 30) | | | 0.23 | 0.36 | 0.41 | 0.38 | 0.75 |
| | (6)G' (Tg + 80) | | | 138600 | 140800 | 159120 | 163800 | 185490 |
| | (6)G' (Tg + 80)/G' (Tg + 30) | | | 0.60 | 0.64 | 0.68 | 0.70 | 0.81 |

TABLE 5

| | | | | Example 31 | Example 32 | Example 33 | Example 34 | Example 35 |
|---|---|---|---|---|---|---|---|---|
| Formulation of first layer Resin composition for intermediate layer | Polyvinyl butyral resin | Average degree of polymerization of PVA | | 2300 | 2300 | 2300 | 2300 | 2300 |
| | | Degree of butyralization | mol % | 64.5 | 64.5 | 64.5 | 64.5 | 64.5 |
| | | Degree of acetylation | mol % | 12.5 | 12.5 | 12.5 | 12.5 | 12.5 |
| | | Hydroxy group content | mol % | 23 | 23 | 23 | 23 | 23 |
| | | Amount | Parts by weight | 100 | 100 | 100 | 100 | 100 |
| | Plasticizer | Kind | | 3GO | 3G7 | 3GO | 3GO | 3GO |
| | | Amount | Parts by weight | 60 | 60 | 60 | 60 | 60 |
| | Compound having a boron atom | Kind | | n-butylboronic acid | n-butylboronic acid | n-butylboronic acid | n-butylboronic acid | 4-acetyl-phenylboronic acid |
| | | Amount | Parts by weight | 1.6 | 3.2 | 4.8 | 6.4 | 1.6 |
| | Boron content•boron atom concentration in the resin composition for intermediate layer | | ppm | 1050 | 2080 | 3090 | 4080 | 650 |
| | Surfactant A | Amount | Parts by weight | — | — | — | — | — |
| | Surfactant B | Amount | Parts by weight | — | — | — | — | — |
| | Surfactant C | Amount | Parts by weight | — | — | — | — | — |
| Formulation of second and third layers Resin composition for surface layer | Polyvinyl butyral resin | Degree of butyralization | mol % | 70.5 | 69.5 | 68 | 69.9 | 67.9 |
| | | Degree of acetylation | mol % | 1.2 | 0.8 | 0.7 | 0.9 | 1.2 |
| | | Hydroxy group content | mol % | 28.3 | 29.7 | 31.3 | 29.2 | 30.9 |
| | | Amount | Parts by weight | 100 | 100 | 100 | 100 | 100 |
| | Plasticizer | Kind | | 3GO | 3G7 | 3GO | 3GO | 3GO |
| | | Amount | Parts by weight | 38 | 39.5 | 37.5 | 37.5 | 37.5 |
| Evaluation | (1)Sound insulation: TL value | | | ◯ | ◯ | ◯ | ◯ | ◯ |
| | (3)State of bubble formation in test method C | | | ◯ | ◯ | ◯◯ | ◯◯ | ◯◯ |
| | (4)Penetration resistance | | 4 m | Passed | Passed | Passed | Passed | Passed |
| | | | 5 m | Passed | Passed | Passed | Passed | Passed |
| | | | 6 m | Passed | Passed | Passed | Passed | Passed |
| | (5)G' (Tg + 30) | | | 223742 | 240800 | 231057 | 209725 | 241649 |
| | (5)G' (Tg + 170) | | | 51389.5 | 68286.7 | 79313.4 | 101040 | 109202 |

TABLE 5-continued

| | | | | | | | | |
|---|---|---|---|---|---|---|---|---|
| (5)G' (Tg + 170)/G' (Tg + 30) | | | | 0.23 | 0.28 | 0.34 | 0.48 | 0.45 |
| (5)G' (Tg + 80) | | | | 138813 | 153803 | 154913 | 140813 | 171061 |
| (5)G' (Tg + 80)/G' (Tg + 30) | | | | 0.62 | 0.64 | 0.67 | 0.67 | 0.71 |
| (6)G' (Tg + 30) | | | | 222000 | 240000 | 229000 | 205000 | 239000 |
| (6)G' (Tg + 170) | | | | 48840 | 64800 | 77860 | 96350 | 105160 |
| (6)G' (Tg + 170)/G' (Tg + 30) | | | | 0.22 | 0.27 | 0.34 | 0.47 | 0.44 |
| (6)G' (Tg + 80) | | | | 135420 | 151200 | 153430 | 137350 | 167300 |
| (6)G' (Tg + 80)/G' (Tg + 30) | | | | 0.61 | 0.63 | 0.67 | 0.67 | 0.70 |

| | | | | Example 36 | Example 37 | Example 38 | Example 39 |
|---|---|---|---|---|---|---|---|
| Formulation of first layer Resin composition for intermediate layer | Polyvinyl butyral resin | Average degree of polymerization of PVA | | 2300 | 2300 | 2300 | 2300 |
| | | Degree of butyralization | mol % | 64.5 | 64.5 | 64.5 | 64.5 |
| | | Degree of acetylation | mol % | 12.5 | 12.5 | 12.5 | 12.5 |
| | | Hydroxy group content | mol % | 23 | 23 | 23 | 23 |
| | | Amount | Parts by weight | 100 | 100 | 100 | 100 |
| | Plasticizer | Kind | | 3GO | 3G7 | 3GO | 3GO |
| | | Amount | Parts by weight | 60 | 60 | 60 | 60 |
| | Compound having a boron atom | Kind | | 2-isopropoxy-4,4,5,5-tetramethyl-1,3,2-dioxaborolane | 2-isopropoxy-4,4,5,5-tetramethyl-1,3,3-dioxaborolane | 2-isopropoxy-4,4,5,5-tetramethyl-1,3,4-dioxaborolane | 2-isopropoxy-4,4,5,5-tetramethyl-1,3,5-dioxaborolane |
| | | Amount | Parts by weight | 0.056 | 0.083 | 0.111 | 0.138 |
| | Boron content•boron atom concentration in the resin composition for intermediate layer | | ppm | 20 | 30 | 40 | 50 |
| | Surfactant A | Amount | Parts by weight | — | — | — | — |
| | Surfactant B | Amount | Parts by weight | — | — | — | — |
| | Surfactant C | Amount | Parts by weight | — | — | — | — |
| Formulation of second and third layers Resin composition for surface layer | Polyvinyl butyral resin | Degree of butyralization | mol % | 68.5 | 68.3 | 68.8 | 68.5 |
| | | Degree of acetylation | mol % | 1 | 1.1 | 1.5 | 1 |
| | | Hydroxy group content | mol % | 30.5 | 30.6 | 29.7 | 30.5 |
| | | Amount | Parts by weight | 100 | 100 | 100 | 100 |
| | Plasticizer | Kind | | 3GO | 3G7 | 3GO | 3GO |
| | | Amount | Parts by weight | 37.5 | 37.5 | 39.5 | 40.5 |
| Evaluation | (1)Sound insulation: TL value | | | ◯ | ◯ | ◯ | ◯ |
| | (3)State of bubble formation in test method C | | | ◯◯ | ◯◯ | ◯◯ | ◯◯ |
| | (4)Penetration resistance | | 4 m | Passed | Passed | Passed | Passed |
| | | | 5 m | Passed | Passed | Passed | Passed |
| | | | 6 m | Passed | Passed | Passed | Passed |
| | (5)G' (Tg + 30) | | | 228690 | 226174 | 217810 | 233513 |
| | (5)G' (Tg + 170) | | | 66398.5 | 77592 | 95213.5 | 99720.4 |
| | (5)G' (Tg + 170)/G' (Tg + 30) | | | 0.290 | 0.343 | 0.437 | 0.427 |
| | (5)G' (Tg + 80) | | | 149104 | 149277 | 150068 | 164061 |
| | (5)G' (Tg + 80)/G' (Tg + 30) | | | 0.65 | 0.66 | 0.69 | 0.70 |
| | (6)G' (Tg + 30) | | | 225000 | 224000 | 217000 | 232000 |
| | (6)G' (Tg + 170) | | | 63000 | 76160 | 93310 | 97440 |
| | (6)G' (Tg + 170)/G' (Tg + 30) | | | 0.28 | 0.34 | 0.43 | 0.42 |
| | (6)G' (Tg + 80) | | | 144000 | 145600 | 147560 | 162400 |
| | (6)G' (Tg + 80)/G' (Tg + 30) | | | 0.64 | 0.65 | 0.68 | 0.70 |

TABLE 6

| | | | | Example 40 | Example 41 | Example 42 | Example 43 |
|---|---|---|---|---|---|---|---|
| Formulation of first layer Resin | Polyvinyl butyral resin | Average degree of polymerization of PVA | | 2300 | 2300 | 2300 | 2300 |
| | | Degree of butyralization | mol % | 64.5 | 64.5 | 64.5 | 64.5 |

TABLE 6-continued

| | | | | | | | |
|---|---|---|---|---|---|---|---|
| composition for intermediate layer | | Degree of acetylation | mol % | 12.5 | 12.5 | 12.5 | 12.5 |
| | | Hydroxy group content | mol % | 23 | 23 | 23 | 23 |
| | | Amount | Parts by weight | 100 | 100 | 100 | 100 |
| | Plasticizer | Kind | | 3GO | 3G7 | 3GO | 3G7 |
| | | Amount | Parts by weight | 60 | 60 | 60 | 60 |
| | Compound having a boron atom | Kind | | triisopropyl borate | triisopropyl borate | triisopropyl borate | triisopropyl borate |
| | | Amount | Parts by weight | 0.056 | 0.084 | 0.112 | 0.14 |
| | Boron content•boron atom concentration in the resin composition for intermediate layer | | ppm | 20 | 30 | 40 | 50 |
| | Surfactant A | Amount | Parts by weight | — | — | — | — |
| | Surfactant B | Amount | Parts by weight | — | — | — | — |
| | Surfactant C | Amount | Parts by weight | — | — | — | — |
| Formulation of second and third layers Resin composition for surface layer | Polyvinyl butyral resin | Degree of butyralization | mol % | 68.5 | 69 | 68.8 | 70 |
| | | Degree of acetylation | mol % | 0.9 | 1.2 | 0.8 | 0.7 |
| | | Hydroxy group content | mol % | 30.6 | 29.8 | 30.4 | 29.3 |
| | | Amount | Parts by weight | 100 | 100 | 100 | 100 |
| | Plasticizer | Kind | | 3GO | 3G7 | 3GO | 3G7 |
| | | Amount | Parts by weight | 38 | 37.5 | 38.5 | 37.5 |
| Evaluation | (1)Sound insulation: TL value | | | ◯ | ◯ | ◯ | ◯ |
| | (3)State of bubble formation in test method C | | | ◯◯ | ◯◯ | ◯◯ | ◯◯ |
| | (4)Penetration resistance | | 4 m | Passed | Passed | Passed | Passed |
| | | | 5 m | Passed | Passed | Passed | Passed |
| | | | 6 m | Passed | Passed | Passed | Passed |
| | (5)G' (Tg + 30) | | | 241582 | 230655 | 229400 | 231896 |
| | (5)G' (Tg + 170) | | | 62627.1 | 80860.5 | 92336.4 | 118854 |
| | (5)G' (Tg + 170)/G' (Tg + 30) | | | 0.259 | 0.351 | 0.403 | 0.513 |
| | (5)G' (Tg + 80) | | | 156052 | 154680 | 158040 | 161612 |
| | (5)G' (Tg + 80)/G' (Tg + 30) | | | 0.65 | 0.67 | 0.69 | 0.70 |
| | (6)G' (Tg + 30) | | | 240000 | 229000 | 227000 | 230000 |
| | (6)G' (Tg + 170) | | | 60000 | 80150 | 88530 | 115000 |
| | (6)G' (Tg + 170)/G' (Tg + 30) | | | 0.25 | 0.35 | 0.39 | 0.50 |
| | (6)G' (Tg + 80) | | | 156000 | 151140 | 154360 | 158700 |
| | (6)G' (Tg + 80)/G' (Tg + 30) | | | 0.65 | 0.66 | 0.68 | 0.69 |

| | | | | Example 44 | Example 45 | Example 46 | Example 47 |
|---|---|---|---|---|---|---|---|
| Formulation of first layer Resin composition for intermediate layer | Polyvinyl butyral resin | Average degree of polymerization of PVA | | 2300 | 2300 | 2300 | 2300 |
| | | Degree of butyralization | mol % | 64.5 | 64.5 | 64.5 | 64.5 |
| | | Degree of acetylation | mol % | 12.5 | 12.5 | 12.5 | 12.5 |
| | | Hydroxy group content | mol % | 23 | 23 | 23 | 23 |
| | | Amount | Parts by weight | 100 | 100 | 100 | 100 |
| | Plasticizer | Kind | | 3GO | 3GO | 3GO | 3GO |
| | | Amount | Parts by weight | 60 | 60 | 60 | 60 |
| | Compound having a boron atom | Kind | | tri-n-propyl borate | tri-n-propyl borate | tri-n-propyl borate | tri-n-propyl borate |
| | | Amount | Parts by weight | 0.056 | 0.084 | 0.112 | 0.14 |
| | Boron content•boron atom concentration in the resin composition for intermediate layer | | ppm | 20 | 30 | 40 | 50 |
| | Surfactant A | Amount | Parts by weight | — | — | — | — |
| | Surfactant B | Amount | Parts by weight | — | — | — | — |
| | Surfactant C | Amount | Parts by weight | — | — | — | — |
| Formulation of second | Polyvinyl butyral | Degree of butyralization | mol % | 69.5 | 70.5 | 68.4 | 68.5 |

TABLE 6-continued

| | | | | | | | |
|---|---|---|---|---|---|---|---|
| and third layers | resin | Degree of acetylation | mol % | 0.8 | 0.9 | 1 | 1.2 |
| Resin composition for surface layer | | Hydroxy group content | mol % | 29.7 | 28.6 | 30.6 | 30.3 |
| | | Amount | Parts by weight | 100 | 100 | 100 | 100 |
| | Plasticizer | Kind | | 3GO | 3GO | 3GO | 3GO |
| | | Amount | Parts by weight | 38 | 37.5 | 38.5 | 37.5 |
| Evaluation | (1)Sound insulation: TL value | | | ◯ | ◯ | ◯ | ◯ |
| | (3)State of bubble formation in test method C | | | ◯ | ◯◯ | ◯◯ | ◯◯ |
| | (4)Penetration resistance | | 4 m | Passed | Passed | Passed | Passed |
| | | | 5 m | Passed | Passed | Passed | Passed |
| | | | 6 m | Passed | Passed | Passed | Passed |
| | (5)G' (Tg + 30) | | | 220376 | 231589 | 236904 | 237401 |
| | (5)G' (Tg + 170) | | | 67153.9 | 82678.5 | 100540 | 114734 |
| | (5)G' (Tg + 170)/G' (Tg + 30) | | | 0.305 | 0.357 | 0.424 | 0.483 |
| | (5)G' (Tg + 80) | | | 132571 | 152335 | 161173 | 167461 |
| | (5)G' (Tg + 80)/G' (Tg + 30) | | | 0.60 | 0.66 | 0.68 | 0.71 |
| | (6)G' (Tg + 30) | | | 219000 | 229000 | 231000 | 230000 |
| | (6)G' (Tg + 170) | | | 63510 | 77860 | 94710 | 105800 |
| | (6)G' (Tg + 170)/G' (Tg + 30) | | | 0.29 | 0.34 | 0.41 | 0.46 |
| | (6)G' (Tg + 80) | | | 129210 | 151140 | 157080 | 161000 |
| | (6)G' (Tg + 80)/G' (Tg + 30) | | | 0.59 | 0.66 | 0.68 | 0.70 |

TABLE 7

| | | | | Example 48 | Example 49 | Example 50 | Example 51 | Example 52 |
|---|---|---|---|---|---|---|---|---|
| Formulation of first layer Resin composition for intermediate layer | Polyvinyl butyral resin | Average degree of polymerization of PVA | | 1700 | 1700 | 1700 | 1700 | 1700 |
| | | Degree of butyralization | mol % | 64.5 | 64.5 | 64.5 | 64.5 | 64.5 |
| | | Degree of acetylation | mol % | 12.5 | 12.5 | 12.5 | 12.5 | 12.5 |
| | | Hydroxy group content | mol % | 23 | 23 | 23 | 23 | 23 |
| | | Amount | Parts by weight | 100 | 100 | 100 | 100 | 100 |
| | Plasticizer | Kind | | 3GO | 3GO | 3GO | 3GO | 3GO |
| | | Amount | Parts by weight | 60 | 60 | 60 | 60 | 60 |
| | Compound having a boron atom | Kind | | tri-n-butyl borate | tri-n-butyl borate | tri-n-butyl borate | tri-n-butyl borate | tri-n-butyl borate |
| | | Amount | Parts by weight | 0.171 | 0.256 | 0.342 | 0.427 | 0.513 |
| | Boron content•boron atom concentration in the resin composition for intermediate layer | | ppm | 50 | 75 | 100 | 125 | 150 |
| | Surfactant A | Amount | Parts by weight | — | — | — | — | — |
| | Surfactant B | Amount | Parts by weight | — | — | — | — | — |
| | Surfactant C | Amount | Parts by weight | — | — | — | — | — |
| Formulation of second and third layers Resin composition for surface layer | Polyvinyl butyral resin | Degree of butyralization | mol % | 69 | 69.5 | 68.9 | 68.5 | 68.2 |
| | | Degree of acetylation | mol % | 0.8 | 0.7 | 0.8 | 0.9 | 0.8 |
| | | Hydroxy group content | mol % | 30.2 | 29.8 | 30.3 | 30.6 | 31 |
| | | Amount | Parts by weight | 100 | 100 | 100 | 100 | 100 |
| | Plasticizer | Kind | | 3GO | 3GO | 3GO | 3GO | 3GO |
| | | Amount | Parts by weight | 38 | 37.5 | 38.5 | 37.5 | 30 |
| Evaluation | (1)Sound insulation: TL value | | | ◯ | ◯ | ◯ | ◯ | ◯ |
| | (3)State of bubble formation in test method C | | | ◯ | ◯ | ◯ | ◯◯ | ◯◯ |
| | (4)Penetration resistance | | 4 m | Passed | Passed | Passed | Passed | Passed |
| | | | 5 m | Passed | Passed | Passed | Passed | Passed |
| | | | 6 m | Passed | Passed | Passed | Passed | Passed |
| | (5)G' (Tg + 30) | | | 224031 | 219597 | 220747 | 226443 | 200100 |
| | (5)G' (Tg + 170) | | | 62664.1 | 96247.5 | 122079 | 145512 | 162465 |
| | (5)G' (Tg + 170)/G' (Tg + 30) | | | 0.280 | 0.438 | 0.553 | 0.643 | 0.812 |
| | (5)G' (Tg + 80) | | | 121947 | 129954 | 141584 | 152323 | 139511 |
| | (5)G' (Tg + 80)/G' (Tg + 30) | | | 0.54 | 0.59 | 0.64 | 0.67 | 0.70 |

TABLE 7-continued

|  |  |  | | | | | |
|---|---|---|---|---|---|---|---|
| (6)G' (Tg + 30) | | | 221000 | 214000 | 220000 | 219000 | 200500 |
| (6)G' (Tg + 170) | | | 61880 | 92020 | 118800 | 140160 | 162405 |
| (6)G' (Tg + 170)/G' (Tg + 30) | | | 0.28 | 0.43 | 0.54 | 0.64 | 0.81 |
| (6)G' (Tg + 80) | | | 117130 | 124120 | 140800 | 144540 | 140350 |
| (6)G' (Tg + 80)/G' (Tg + 30) | | | 0.53 | 0.58 | 0.64 | 0.66 | 0.70 |

| | | | | Example 53 | Example 54 | Example 55 | Example 56 | Example 57 |
|---|---|---|---|---|---|---|---|---|
| Formulation of first layer Resin composition for intermediate layer | Polyvinyl butyral resin | Average degree of polymerization of PVA | | 1700 | 2300 | 2300 | 2300 | 2300 |
| | | Degree of butyralization | mol % | 64.5 | 64.5 | 64.5 | 64.5 | 64.5 |
| | | Degree of acetylation | mol % | 12.5 | 12.5 | 12.5 | 12.5 | 12.5 |
| | | Hydroxy group content | mol % | 23 | 23 | 23 | 23 | 23 |
| | | Amount | Parts by weight | 100 | 100 | 100 | 100 | 100 |
| | Plasticizer | Kind | | 3GO | 3GO | 3G7 | 3GO | 3GO |
| | | Amount | Parts by weight | 60 | 57.5 | 55 | 50 | 45 |
| | Compound having a boron atom | Kind | | tri-n-butyl borate | tri-n-butyl borate | tri-n-butyl borate | tri-n-butyl borate | tri-n-butyl borate |
| | | Amount | Parts by weight | 0.599 | 0.137 | 0.137 | 0.137 | 0.137 |
| | Boron content•boron atom concentration in the resin composition for intermediate layer | | ppm | 175 | 40 | 40 | 40 | 40 |
| | Surfactant A | Amount | Parts by weight | — | 2.5 | 5 | 10 | 15 |
| | Surfactant B | Amount | Parts by weight | — | — | — | — | — |
| | Surfactant C | Amount | Parts by weight | — | — | — | — | — |
| Formulation of second and third layers Resin composition for surface layer | Polyvinyl butyral resin | Degree of butyralization | mol % | 68.5 | 69.9 | 70.2 | 71 | 70.6 |
| | | Degree of acetylation | mol % | 1 | 0.8 | 1.1 | 0.7 | 1.2 |
| | | Hydroxy group content | mol % | 30.5 | 29.3 | 28.7 | 28.3 | 28.2 |
| | | Amount | Parts by weight | 100 | 100 | 100 | 100 | 100 |
| | Plasticizer | Kind | | 3GO | 3GO | 3G7 | 3GO | 3GO |
| | | Amount | Parts by weight | 37.5 | 38.5 | 37.5 | 39 | 38.5 |
| Evaluation | (1)Sound insulation: TL value | | | ◯ | ◯ | ◯ | ◯ | ◯ |
| | (3)State of bubble formation in test method C | | | ◯◯ | ◯◯ | ◯◯ | ◯◯ | ◯◯ |
| | (4)Penetration resistance | | 4 m | Passed | Passed | Passed | Passed | Passed |
| | | | 5 m | Passed | Passed | Passed | Passed | Passed |
| | | | 6 m | Passed | Passed | Passed | Passed | Passed |
| | (5)G' (Tg + 30) | | | 236597 | 225880 | 230669 | 224530 | 226726 |
| | (5)G' (Tg + 170) | | | 177361 | 96713.2 | 94136.4 | 92419.4 | 84607.2 |
| | (5)G' (Tg + 170)/G' (Tg + 30) | | | 0.750 | 0.428 | 0.408 | 0.412 | 0.373 |
| | (5)G' (Tg + 80) | | | 173557 | 152574 | 159495 | 158971 | 155340 |
| | (5)G' (Tg + 80)/G' (Tg + 30) | | | 0.73 | 0.68 | 0.69 | 0.71 | 0.69 |
| | (6)G' (Tg + 30) | | | 231000 | 224000 | 234000 | 219000 | 223000 |
| | (6)G' (Tg + 170) | | | 170940 | 94080 | 93600 | 87600 | 82510 |
| | (6)G' (Tg + 170)/G' (Tg + 30) | | | 0.74 | 0.42 | 0.40 | 0.40 | 0.37 |
| | (6)G' (Tg + 80) | | | 168630 | 150080 | 159120 | 155490 | 151640 |
| | (6)G' (Tg + 80)/G' (Tg + 30) | | | 0.73 | 0.67 | 0.68 | 0.71 | 0.68 |

The Tables shows the ratio (G'(Tg+170)/G'(Tg+30)) of the resin film B determined by measuring the elastic modulus G' of the resin film B (first layer) containing the polyvinyl acetal resin and the plasticizer, which constituted the first layer of the interlayer film for a laminated glass in each of the Examples and Comparative Examples according to the formulations shown in Tables, after the plasticizer was migrated between the layers of the multilayered interlayer film. As seen in the Tables, the ratio (G'(Tg+170)/G'(Tg+30)) of the resin film B was almost the same as the ratio (G'(Tg+170)/G'(Tg+30)) of the resin film A that contained 100 parts by weight of the polyvinyl acetal resin in the first layer and 60 parts by weight of 3GO. Moreover, the ratio (G'(Tg+80)/G'(Tg+30)) of the resin film B determined by measuring the elastic modulus G' of the resin film B (first layer) containing the polyvinyl acetal resin, and the plasticizer, which constituted the first layer of the interlayer film for a laminated glass in each of the Examples and Comparative Examples according to the formulations shown in Tables, after the plasticizer was migrated between the layers of the multilayered interlayer film. The ratio (G'(Tg+80)/G'(Tg+30)) of the resin film B was almost the same as the ratio (G'(Tg+80)/G'(Tg+30)) of the resin film A that contained 100 parts by weight of the polyvinyl acetal resin in the first layer and 60 parts by weight of 3GO.

EXPLANATION OF SYMBOLS

1 Interlayer film
2 First layer

2a One face
2b The other face
3 Second layer
3a Outer surface
4 Third layer
4a Outer surface
11 Laminated glass
12 First component for laminated glass
13 Second component for laminated glass

The invention claimed is:

1. An interlayer film for a laminated glass, comprising
a first layer containing a polyvinyl acetal resin and a plasticizer, and
a second layer containing a polyvinyl acetal resin and a plasticizer, the second layer being laminated on one face of the first layer,
wherein, in the case of measuring viscoelasticity of as resin film formed from the first layer, the resin film, having a glass transition temperature of has an elastic modulus of G'(Tg+170) at (Tg+170)° C. and an elastic modulus of G'(Tg+30) at (Tg+30)° C., and provides a ratio (G'(Tg+170)/G'(Tg+30)) of 0.18 or higher,
an amount of the plasticizer for each 100 parts by weight of the polyvinyl acetal resin in the first layer is larger than an amount the plasticizer for each 100 parts by weight of the polyvinyl acetal resin in the second layer, and
the hydroxyl content of the polyvinyl acetal resin in the first is lower than the hydroxyl content of the polyvinyl acetal resin in the second layer.

2. An interlayer film for a laminated glass, comprising
a first layer containing a polyvinyl acetal resin and a plasticizer, and
a second layer containing a polyvinyl acetal resin and a plasticizer, the second layer being laminated on one face of the first layer,
wherein, in the case of measuring viscoelasticity of a resin film containing 100 parts by weight of the polyvinyl acetal resin contained in the first layer and 60 parts by weight of triethylene glycol di-2-ethylhexanoate (3GO) as a plasticizer, the resin film, having a glass transition temperature of Tg(° C.), has an elastic modulus of G'(Tg+170) at (Tg+170)° C. and an elastic modulus of G'(T+30) at (Tg+30)° C., and provides a ratio (G'(Tg+170)/G'(Tg+30)) of 0.18 or higher,
an amount of the plasticizer for each 100 parts by weight of the polyvinyl acetal resin in the first layer is larger than an amount of the plasticizer for each 100 parts by weight of the polyvinyl acetal resin in the second layer, and
hydroxyl content of the polyvinyl acetal resin in the first layer is lower than the hydroxyl content of the polyvinyl acetal resin in the second layer.

3. The interlayer film for a laminated glass according to claim 1 or 2,
wherein the polyvinyl acetal resin in the first layer has a degree of acetylation of 8 mol % or higher; or
the polyvinyl acetal resin in the first layer has a degree of acetylation of lower than 8 mol % and a degree of acetalization of 68 mol % or higher.

4. The interlayer film for a laminated glass according to claim 3,
wherein the polyvinyl acetal resin in the first layer has a degree of acetylation of 8 mol % or higher.

5. The interlayer film for a laminated glass according to claim 3,
wherein the polyvinyl acetal resin in the first layer has a degree of acetylation of lower than 8 mol % and a degree of acetalization of 68 mol % or higher.

6. The interlayer film for a laminated glass according to claim 1 or 2,
wherein the first layer contains a compound having a boron atom.

7. The interlayer film for a laminated glass according to claim 6,
wherein the compound having a boron atom includes at least one selected from the group consisting of lithium metaborate, sodium tetraborate, potassium tetraborate, boric acid, and boric acid esters.

8. The interlayer film for a laminated glass according to claim 1 or 2,
wherein the elastic modulus G'(Tg+30) is 200,000 Pa or higher.

9. The interlayer film for a laminated glass according to claim 1 or 2,
wherein the polyvinyl acetal resin in the first layer has a molecular-weight distribution ratio (weight-average molecular weight Mw/number-average molecular weight Mn) of 6.5 or lower.

10. The interlayer film for a laminated glass according to claim 9,
wherein the polyvinyl acetal resin in the first layer has a molecular-weight distribution ratio (weight-average molecular weight Mw/number-average molecular weight Mn) of 2.5 to 3.2.

11. The interlayer film for a laminated glass according to claim 1 or 2,
wherein an amount of the plasticizer for each 100 parts by weight of the polyvinyl acetal resin in the first layer is 50 parts by weight or more.

12. The interlayer film for a laminated glass according, to claim 11,
wherein the amount of the plasticizer for each 100 parts by weight of the polyvinyl resin in the first layer is 55 parts by weight or more.

13. The interlayer film for a laminated glass according to claim 1 or 2,
wherein the polyvinyl acetal resin in the first layer has a hydroxy group content of 30 mol % or lower.

14. The interlayer film for a laminated glass according to claim 1 or 2, further comprising a third layer containing a polyvinyl acetal resin and a plasticizer, the third layer being laminated on the other face of the first layer.

15. The interlayer film for a laminated glass according to claim 14,
wherein the amount of the plasticizer for each 100 parts by weight of the polyvinyl acetal resin in the first layer is larger than the amount of the plasticizer for each 100 parts by weight of the polyvinyl acetal resin in the second layer or the third layer.

16. The interlayer film for a laminated glass according to claim 14,
wherein the polyvinyl acetal resin in each of the first layer, the second layer and the third layer contains a polyvinyl butyral resin, and
the plasticizer in each of the first layer, the second layer and the third layer contains at least one selected from the group consisting of triethylene glycol di-2-ethylbutyrate, triethylene glycol di-2-ethylhexanoate, and triethylene glycol di-n-heptanoate.

17. A laminated glass, comprising
a first component for laminated glass,
a second component for laminated glass, and an interlayer film sandwiched between the first component for laminated glass and the second component for laminated glass,
wherein the interlayer film is the interlayer for a laminated glass according to claim 1 or 2.

* * * * *